(12) United States Patent
Barth

(10) Patent No.: US 7,627,606 B2
(45) Date of Patent: Dec. 1, 2009

(54) SECONDARY SEARCH FOR A TRAVEL RELATED ITEM BASED ON THE DETECTION OF A PURCHASE OFFER FROM A PRIOR TRAVEL RELATED SEARCH

(75) Inventor: Brian E. Barth, Incline Village, NV (US)

(73) Assignee: Kayak Software Corporation, Norwalk, CT (US)

( * ) Notice: Subject to any disclaimer, the term of this patent is extended or adjusted under 35 U.S.C. 154(b) by 732 days.

(21) Appl. No.: 11/201,376

(22) Filed: Aug. 10, 2005

(65) Prior Publication Data

US 2006/0080297 A1 Apr. 13, 2006

Related U.S. Application Data

(62) Division of application No. 10/903,623, filed on Jul. 30, 2004, now Pat. No. 7,349,894.

(51) Int. Cl.
*G06F 17/00* (2006.01)
(52) U.S. Cl. .................. 707/104.1; 707/101; 707/102; 707/103 R; 707/3; 705/26
(58) Field of Classification Search ............ 707/1–10, 707/100–104.1, 200–206; 705/26–27
See application file for complete search history.

(56) References Cited

U.S. PATENT DOCUMENTS 5,850,433 A 12/1998 Rondeau
6,044,404 A 3/2000 Holdsworth et al.
6,272,472 B1 8/2001 Danneels et al.
6,297,819 B1 10/2001 Furst
6,360,205 B1 * 3/2002 Iyengar et al. ............... 705/5
6,480,837 B1 11/2002 Dutta
6,549,941 B1 4/2003 Jaquith et al.
6,571,256 B1 5/2003 Dorian et al.
6,697,824 B1 2/2004 Bowman-Amuah
6,801,226 B1 10/2004 Daughtrey
6,856,967 B1 2/2005 Woolston et al.
6,928,615 B1 8/2005 Haitsuka et al.
7,050,986 B1 5/2006 Vance et al.
2001/0020242 A1 9/2001 Gupta et al.

* cited by examiner

*Primary Examiner*—Isaac M Woo
(74) *Attorney, Agent, or Firm*—Fenwick & West LLP

(57) ABSTRACT

A method and apparatus are provided for a dynamic information connection engine. User actions are detected on at least one client system. In response, a determination is made whether the user is searching for supported information. When the user is searching for supported information, information is extracted electronically from third party web sites, direct supplier connections, and intermediate databases. Potential information suppliers are automatically selected in response to the detected user search. Queries are formulated from the user search and transferred to each selected supplier over a network coupling. The queries include a request for information. Responses are received from the suppliers, and the responses are used to generate a result list for the user. The result list includes information and query status information. Further, an electronic link may be provided to a web site of each supplier from which the information was derived.

14 Claims, 13 Drawing Sheets

SECONDARY SEARCH FOR A TRAVEL RELATED ITEM BASED ON THE DETECTION OF A PURCHASE OFFER FROM A PRIOR TRAVEL RELATED SEARCH

RELATED APPLICATIONS

This application is a divisional of U.S. application Ser. No. 10/903,623, filed Jul. 30, 2004, now U.S. Pat. No. 7,349,894 which claims the benefit of U.S. application Ser. No. 09/815,836, filed Mar. 22, 2001, which claims the benefit of U.S. Provisional Application Ser. No. 60/191,346, filed Mar. 22, 2000.

BACKGROUND

1. Field of the Invention

The present invention relates to systems used to find and present information from multiple sources, and more particularly, to systems that find information on the Internet from suppliers or purchasers of goods, services, or commodities and present that information to potential purchasers or suppliers performing comparisons.

2. Description of Related Art

Since the conception of the Internet and extending through the development of Hypertext Transfer Protocol (HTTP) and the World Wide Web (web) to the present, one of the biggest barriers to people taking full advantage of the capabilities offered by the Internet is the difficulty in sifting through the available information to find the desired information. Currently, there are many different search systems available on the Internet. The broad categories of search systems include systems that address very narrow collections of data, systems that operate by first building a local database that describes the contents of the searched web sites, and systems that target a specific type of data. There are a number of ways in which these systems differ, such as the range of information they attempt to search, the technical mechanisms that they use to search, the user interface they provide for specifying the desired data, the user communities to whom they are available, the way they are marketed, and the business models that they are designed to support.

An example of search systems that address very narrow collections of data are the "captive" search systems that are built into/for individual web sites, and allow users of the web site to find desired information within the specific site. In general, there are useful implementations of these systems available, often having user interfaces that can be customized to reflect the contents of the site. However, these search systems are usually not helpful in performing comparisons because individual web sites are typically maintained by individual companies, so the same search operation does not return comparable data.

A typical search engine that purports to search the entire web (that is to say, HTTP servers, which is a subset of the entire Internet) operates by first building a local database that describes the contents of the searched web sites, and then searches that database in response to user queries. Search systems of this type differ primarily in the way they determine which pages of data from which sites are to be added to the database, and in how the database is managed and condensed, as it is impractical in most cases to keep an entire copy of the search range on the search system. Systems of this type typically repeat the process of gathering data from the Internet periodically in order to update the local database so that it accurately reflects the contents of the various web sites searched.

Search systems that target a specific type of data operate like the systems that address very narrow collections of data and the systems that operate by building a local database in that they must gather data from the Internet before users can make requests of the search system. However, the data gathered is generally filtered to determine if it is the desired type. This can either be done implicitly by the search system operators manually creating a list of the web sites that should be searched, or explicitly by an automated portion of the search system. Most existing comparison shopping search systems work in this way.

Another aspect of existing Internet search practice is the technique of processing individual web pages using automated systems to extract desired data, where the web pages typically include HTML source text and are intended to be presented to a human user. To an extent, this technique is used by the systems that operate by building a local database and the systems that target a specific type of data because they have to differentiate HTML formatting directives from text content that is to be searched and from the URLs of other referenced Internet objects that may be the target of subsequent database building.

However, the more detailed and specific process of analyzing a web page for a particular piece or type of data, often referred to as scraping, is not employed by most search systems. There are many systems, both for searching and for other purposes, that employ scraping. However, many scraping implementations have less-than-desirable performance and/or search characteristics and are unsatisfactory for applications in which scraping would otherwise be a viable technique to employ.

Additionally, most existing systems that perform scraping are very limited in the web site structures that they support. For example, some web servers require that the accessor, typically a user, reach a page by passing through a series of other pages. In this type of web site, the content of a page depends not only on its URL but also on prior history, the page location within a framed page, page content that is generated dynamically (such as by a client-interpreted embedded language like JavaScript), and cookies set from the server. Most of these sites cannot be accessed by traditional scraping systems because the systems cannot process a sequence of pages or fully emulate all of the browser functionality required by some pages.

Consequently, there is a need for a system that efficiently gathers and evaluates information from multiple electronic sources and presents relevant information to potential buyers, sellers, or traders. This information includes, but is not limited to, information regarding goods, services, and commodities.

SUMMARY OF THE INVENTION

A method and apparatus are provided for a dynamic information connection engine, wherein user actions are detected on at least one client system. In response, a determination is made whether the user is searching for supported information. When the user is searching for supported information, information is extracted electronically from third party web sites, direct supplier connections, and intermediate databases. Potential information suppliers are automatically selected in response to the detected user search. Queries are formulated from the user search and transferred to each selected supplier over a network coupling. The queries include a request for information. Responses are received from the suppliers, and the responses are used to generate a result list for the user. The result list includes information and query status information.

Further, an electronic link may be provided to a web site of each supplier from which the information was derived.

The descriptions provided herein are exemplary and explanatory and are intended to provide examples of the claimed invention.

BRIEF DESCRIPTION OF THE FIGURES

The accompanying figures illustrate embodiments of the claimed invention. In the figures:

DETAILED DESCRIPTION OF THE INVENTION

The method and apparatus of an embodiment gathers, processes, and delivers information relevant to implicit or explicit user queries. An embodiment of the dynamic information connection engine, or search system, specifically addresses, but is not limited to, systems where the user queries are travel itineraries or descriptions associated with a desired trip, and where the information includes different travel options that fit the itinerary and which the user can purchase. These travel options include, but are not limited to, airline, hotel, and car rental information. This system is easy and inexpensive to implement and maintain, and provides lower distribution costs. Further, the system of an embodiment promotes relationships with brand-loyal customers while also increasing awareness of other available suppliers through extensive comparison capability. Moreover, the system supports the capture of data on consumer and competitor behavior.

Figure 1:
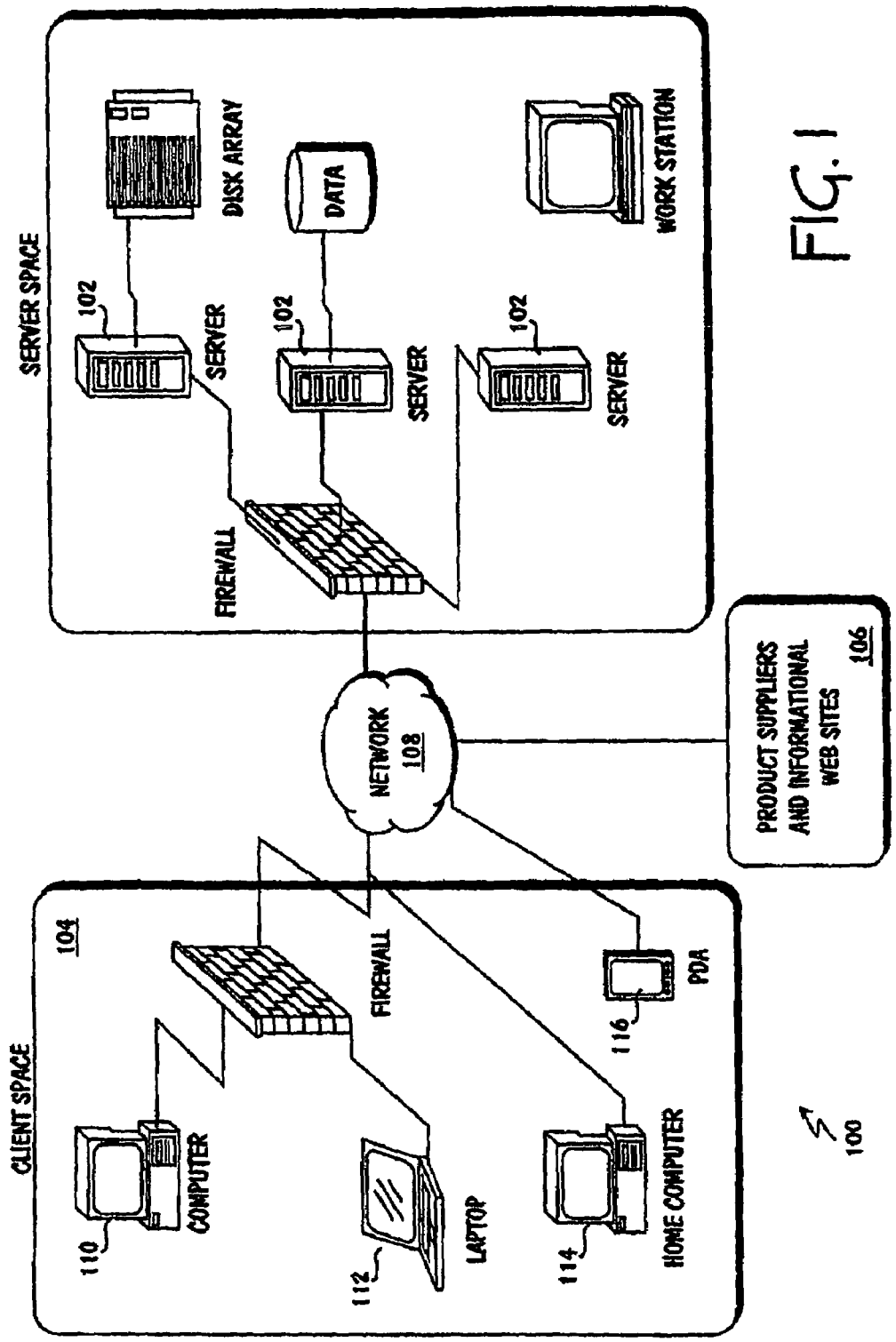
FIG. 1 is a block diagram of transaction system architecture of an embodiment.

FIG. 1 is a block diagram of a transaction system architecture 100 of an embodiment. The system architecture 100 includes one or more system servers 102 coupled among at least one client space 104 or client device 110-116 and at least one participating product supplier and informational web site 106 via at least one network 108. The client devices 110-116 include, but are not limited to, computers, personal computers, portable computing devices including hand-held computers, personal digital assistants, and cellular telephones. The client devices 110-116 may host standard web browsers as well as custom applications software. The network 108 includes, but is not limited to, wired networks, wireless networks, and combined wired and wireless networks. The transaction system architecture 100 accommodates an optional firewall.

Figure 2:
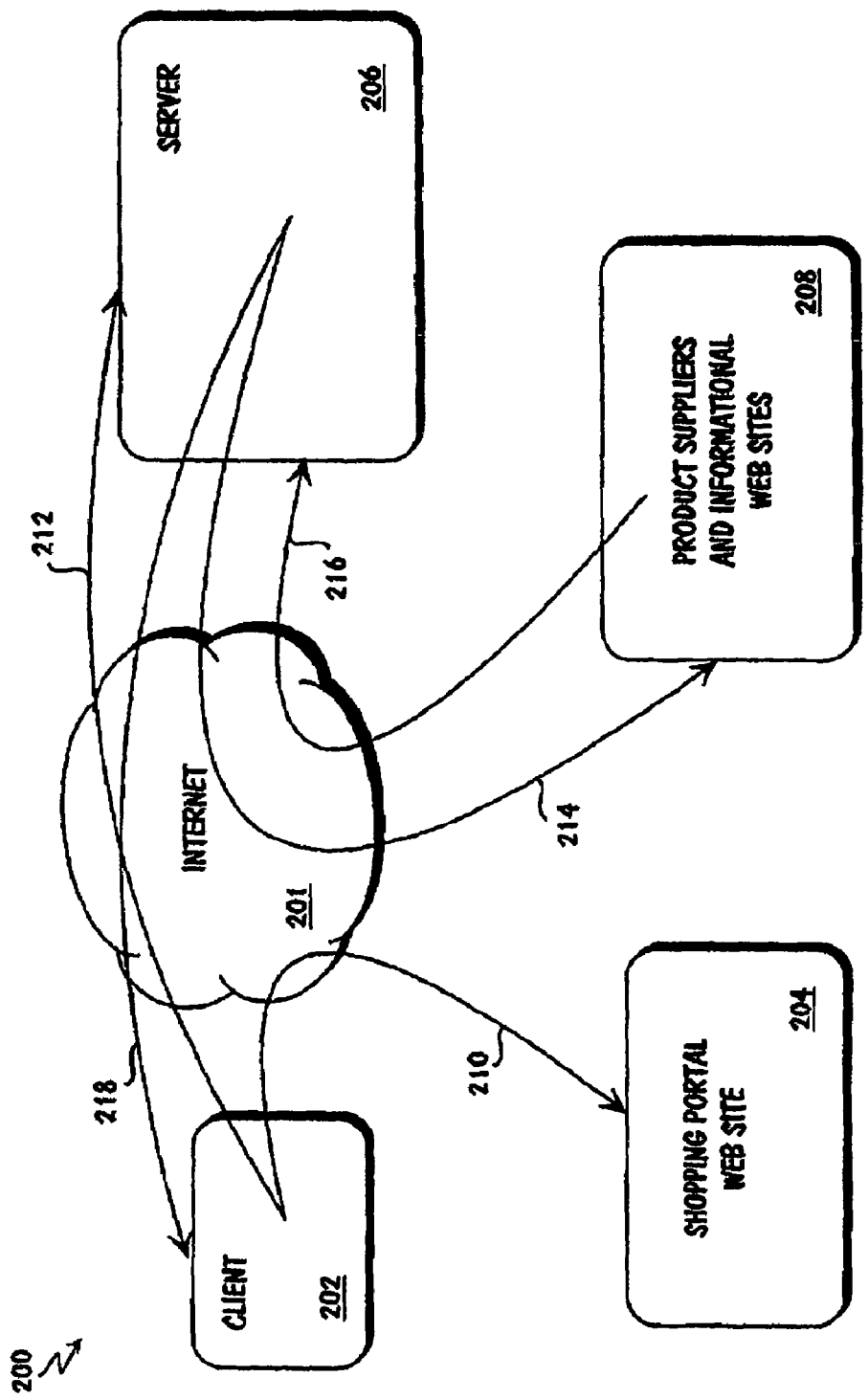
FIG. 2 is a block diagram of a transaction system process flow of an embodiment.

FIG. 2 is a block diagram of a transaction system process flow 200 of an embodiment. A user browses the Internet 201 using a client 202 or client computer. The user accesses 210 a World Wide Web site 204, or web site, in order to shop for a prospective purchase. The client software tracks the user's actions, reporting 212 a subset of these actions to the system server 206, or server. The server 206 collects this information and retains it for future use. The server 206 also immediately analyzes the user action and, in response, makes electronic requests 214, or shadow requests, to product and information suppliers 208, or suppliers, to obtain relevant data. The shadow request communicates the key elements of the action being taken by the user. In response to the shadow requests, the server 206 receives responses 216 from the various product and information suppliers 208 available online. The server 206 evaluates the responses and formulates a response for the user. The response is transmitted 218 to the client 202.

Figure 3:
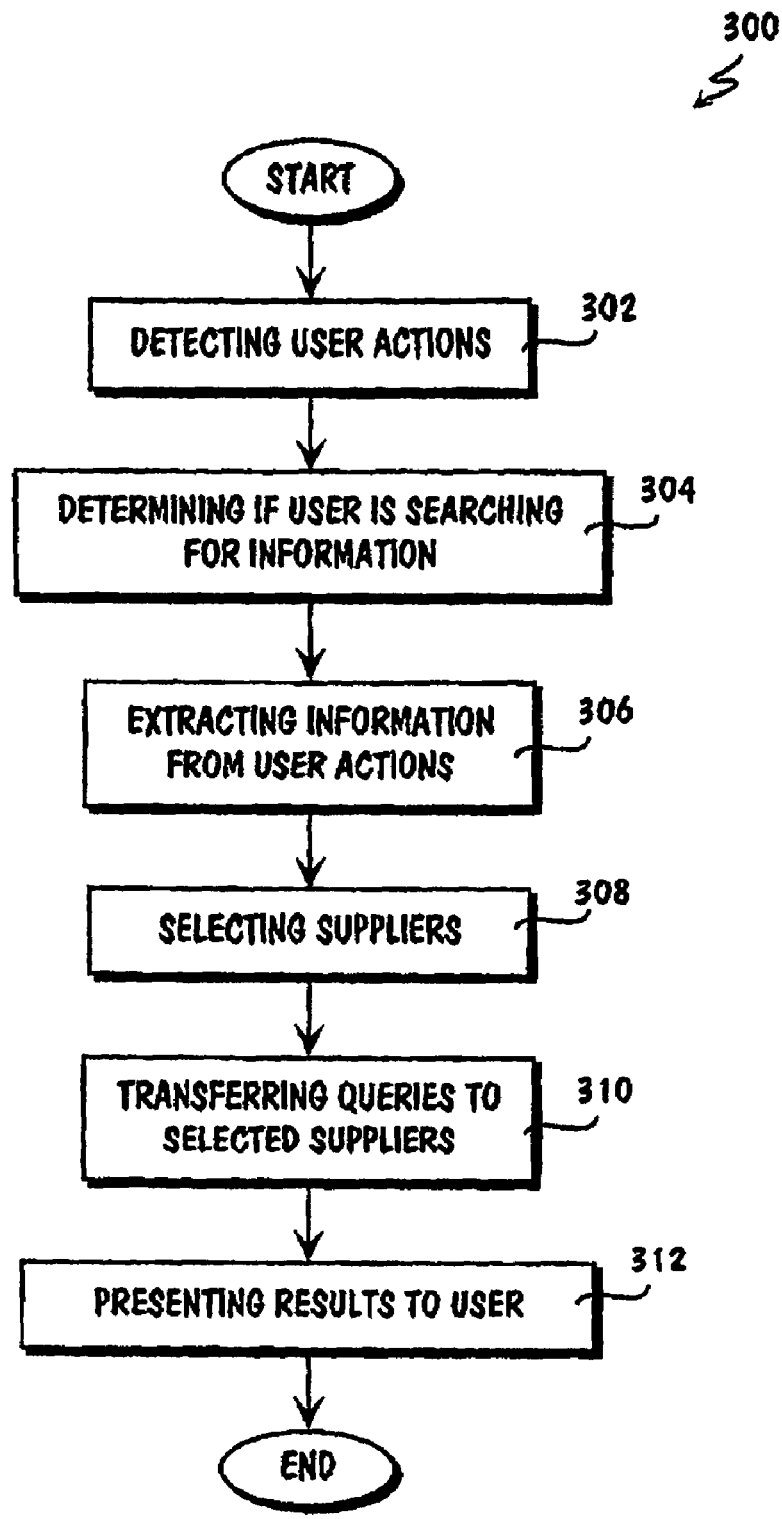
FIG. 3 is a flow diagram of a dynamic information connection engine of an embodiment.

FIG. 3 is a flow diagram 300 of a dynamic information connection method of an embodiment User actions are detected on at least one client system or access device 302. In response, a determination is made whether the user is searching for a supported type of information 304. When the user is searching for product purchase information, information is extracted from user actions 306. Potential suppliers are automatically selected by a server in response to the product information 308. Queries are formulated using the product information and transferred to each selected supplier over a network coupling 310. The queries include a request for product purchase information. Responses are received from the suppliers, and the responses are used to generate a result list for presentation to the user 312. The result list includes product purchase information and query status information. Further, an electronic link is provided to a web site of each supplier from which the product can be purchased.

Figure 4:
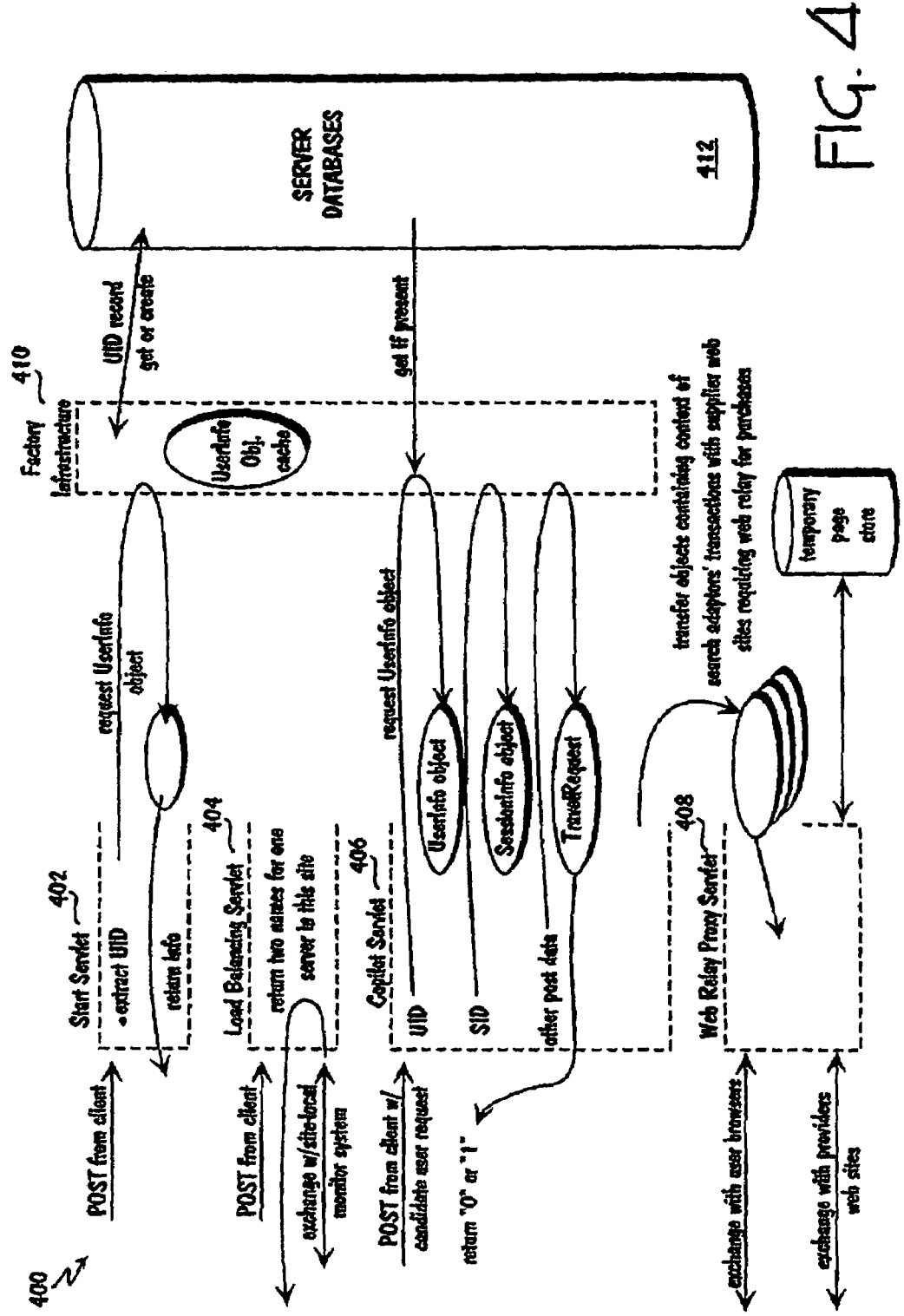
FIG. 4 is a block diagram of the server organization of an embodiment.

FIG. 4 is a block diagram of the server organization 400 of an embodiment. Servlets including a Start Servlet 402, a Load Balancing Servlet 404, a Copilot Servlet 406, and a Web Relay Proxy Servlet 408, along with a factory infrastructure 410 and server databases 412 support the bulk of the server processing, but the system is not so limited.

Figure 5:
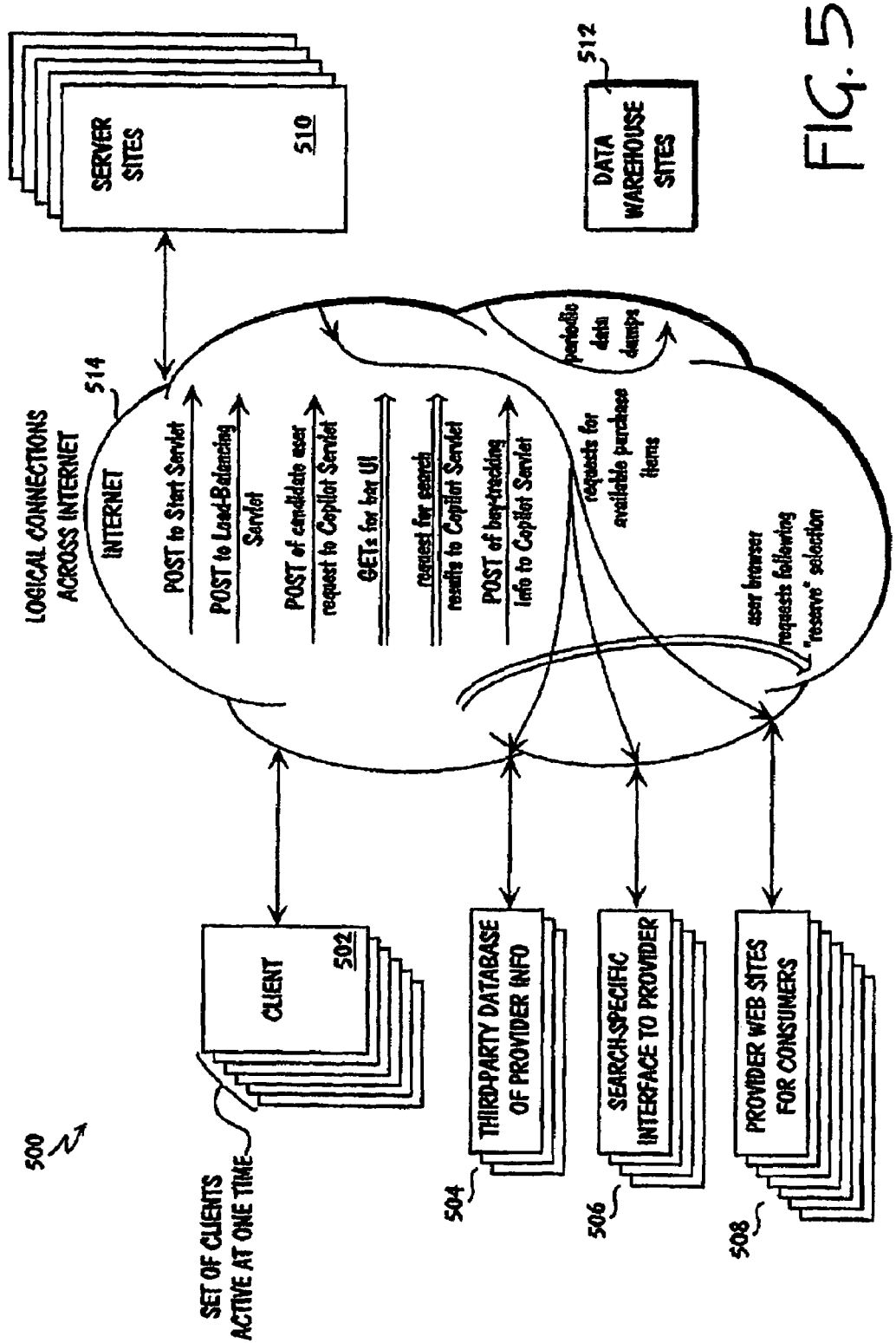
FIG. 5 is a block diagram of a transaction process flow of an embodiment.

FIG. 5 is a block diagram of a transaction process flow 500 of an embodiment. The system supports couplings among numerous clients 502, third party systems 504, search-specific interfaces 506, provider web sites 508, server sites 510, and data warehouse 512 or database sites using at least one network 514. The network 514 includes any of a number of networks, for example, the Internet. The system of an embodiment includes separate client and server portions, although this division is not a necessary part of the invention. The different types of communication between the client 502 and server 510 are ordered top-to-bottom to match the sequence with which these types of communication are performed by any particular client 502. At any one time, there will typically be a large number of clients 502 communicating with each server system 510 as represented by the stack of clients 502.

In an embodiment, the user interacts with a client to input the itinerary and to view the results, while the gathering and processing of the information is performed on a central server. Alternate embodiments could perform all of the processing in the system with which the user directly interacts, or the controlling decisions about what data should be gathered and processed could be made by the central server but with the actual gathering carried out by the client systems in order to alter the over-all usage of network bandwidth required by the system.

The client system of an embodiment incorporates a standard World Wide Web (web) browser (HTTP-protocol client). This provides a simple, standardized mechanism for actually displaying results. The browser is also used to view the web sites of travel suppliers when the user decides to purchase one of the travel options presented.

As a matter of convenience, an embodiment uses the Hypertext Transfer Protocol (HTTP) for communication between the client and server. This protocol is well supported by a variety of off-the-shelf software components, and is also used by the associated web browser.

The server portion of the system is composed of a set of servlets accessed by the client making GET and POST HTTP transfer requests. A servlet is an ongoing process that services some requests received by a web server. In an embodiment, the servlets are written in Java, but are not so limited.

In the interest of simplicity, only the interactions between a single instance of a client system and a single server are described herein. However, it is understood that in actuality each different client proceeds through the possible sequences of operations independently and asynchronously of the others. In addition, an actual commercial implementation can employ several different, parallel server systems at one or more different physical locations in order to supply the necessary processing power and reliability.

The Start Servlet handles the initial communication with a client that is just starting a session. Not only may the user's system that hosts the client be turned on and off repeatedly, but the actual client subsystem may not be used each time the user starts his/her system. Therefore, the server portion of the invention is capable of handling a number of separate start/initialization cycles of each different client over the client's life span.

One key operation for which the Start Servlet is responsible is the association of a client-generated user identification number (UID) with each unique client system, and for ensuring the existence of the appropriate user-specific entries in the server's databases. The UIDs, as well as session IDs (SIDs) and other identifier values used in the preferred embodiment are 128-bit values created such that they should be absolutely unique. They are created using the Windows Globally Unique Identifier (GUID) mechanism, which is in turn based on the Open Software Foundation's (OSF's) Universally Unique Identifier (UUID), a component of the OSF Distributed Computing Environment (DCE).

After the client has initiated communication with the server by making a request to the Start Servlet, the client makes a subsequent request to the Load-Balancing Servlet. The Load-Balancing Servlet determines which of the potentially multiple server systems at a particular location is in the best position to serve future requests for information coming from the requesting client.

The Copilot Servlet is responsible for the fulfillment of most other information requests from the client. The Copilot Servlet receives requests from the client any time the web browser with which the client is integrated is navigating to a Uniform Resource Locator (URL), or information identifier, which the client determines (more on the mechanism below) may be a request for travel information. The servlet responds to these requests in one of two ways, depending on the client's HTTP request.

In one situation, when the client's request does not contain adequate information for the server to perform a search for purchase alternatives, the server informs the client of this and no additional processing takes place. Note that, in an embodiment designed to find and present a category of information other than travel alternatives, the type of URL/request screening performed by the client prior to making a request of the Copilot Servlet could use different criteria, but the step could still be performed.

The other situation is the one in which the URL/request does contain itinerary information with which the server can search for and present information. In this case, the server fulfils the request over a period of time. The server sends back a flag indicating that more information will be following. The HTML and JavaScript template of the page that will be used to display the information found is also presented. Further, the related information is presented incrementally as it is found.

It is noted that while current common practice is to identify individual blocks of data accessible on the Internet using a URL, and an embodiment is described in terms of using URLs, the search system is not so limited. For example, systems which access information suppliers that are not typical web sites (e.g., which use an access protocol other than HTTP v1.0 or v1.1) or which perform the accesses over a network other than the Internet may not use URLs to identify the source of a particular set of information. Similarly, in the future new mechanisms (possibly not intended to be human-readable like URLs) may be created to identify content available on a network. Modifications to embodiments of the present invention used to accommodate such changes in the underlying network technology used to connect among clients, servers, and information suppliers are implementation details unrelated to the inventive material herein. References to URLs in the description herein are reflective of present implementation practice rather than of constraints on the search system.

In an embodiment, the client is implemented as a collection of ActiveX objects which are designed specifically to operate with the Microsoft Internet Explorer (IE) browser under operating systems that support the ActiveX object technology, essentially only recent releases of Microsoft Windows. In this environment, it is possible for the client to establish a very intimate connection with the web browser. It uses this connection to obtain each URL which the browser is requesting as the requests are made. It also uses this connection to establish a sub-window, on the left-hand side of and within the main web browser window, which the client uses to display its user interface and results. This sub-window is referred to herein as a Bar.

In other embodiments, the Bar can be displayed on any portion of the browser window or in its own window and is, therefore, not limited to the left side. The visible, on-screen area occupied by the Bar is filled with a browser control. A browser control is similar to the active display area of the IE web browser, stripped of all of the menus, toolbars, and other user-interface objects normally present when IE is run as a stand-alone application. The Bar makes use of this control to display its user interface and content, and the implementation of the client user interface is partitioned between the compiled software that makes up the Bar and other client ActiveX objects and the JavaScript embedded within the HTML displayed in the browser control.

The client Bar can be opened either explicitly by the user or automatically. It is opened automatically by the client when the client has made a request of the Copilot Servlet, and the Copilot Servlet has responded to the request with a flag indicating that more information will be sent. The HTML that makes up the balance of the Copilot Servlet response is then displayed within the Bar.

If the user explicitly requests that the Bar be opened, the client generates a special URL and request for the Copilot Servlet. This request always returns the correct HTML and JavaScript source for the client user interface, so that the user may directly enter itinerary information for use in performing a travel search, rather than depending on the pages of a third-party web site to provide the itinerary-entry user interface.

In operation, the user accesses the search system of an embodiment using a computer hosting a client system. In an embodiment, the client is implemented as a collection of ActiveX objects. Users are provided access to the client by packaging the ActiveX objects into a Dynamic Link Library (DLL). The DLL, along with associated control files, resides in a cabinet (CAB) file so that it can be downloaded automatically from a web site. In implementations of the invention which are not ActiveX-based and/or specific to Microsoft IE, the DLLs can be packaged as plug-in modules for a web browser so they can be downloaded and installed from a web site.

The web site from which the client is downloaded includes, but is not limited to scripting to detect the type of browser with which the user is accessing the site, so that they can be informed of the level of support for their browser and/or so that they can automatically be directed to the correct download file for their browser. The web site also includes a user interface to collect registration information from the user and pass it to the client for transmission to the server for inclusion in the user's database entry. Additionally, the web site includes a final URL that causes the Bar to automatically open.

Furthermore, in an embodiment, one of the ActiveX objects that make up the client contains Automation Methods that can be called by JavaScript software within the web pages of the client-installation web site. These methods can be used by the web site to find out configuration information about the user system that is not ordinarily available, so that it can be used to give the user more customized information about the client operation.

Figure 6A:
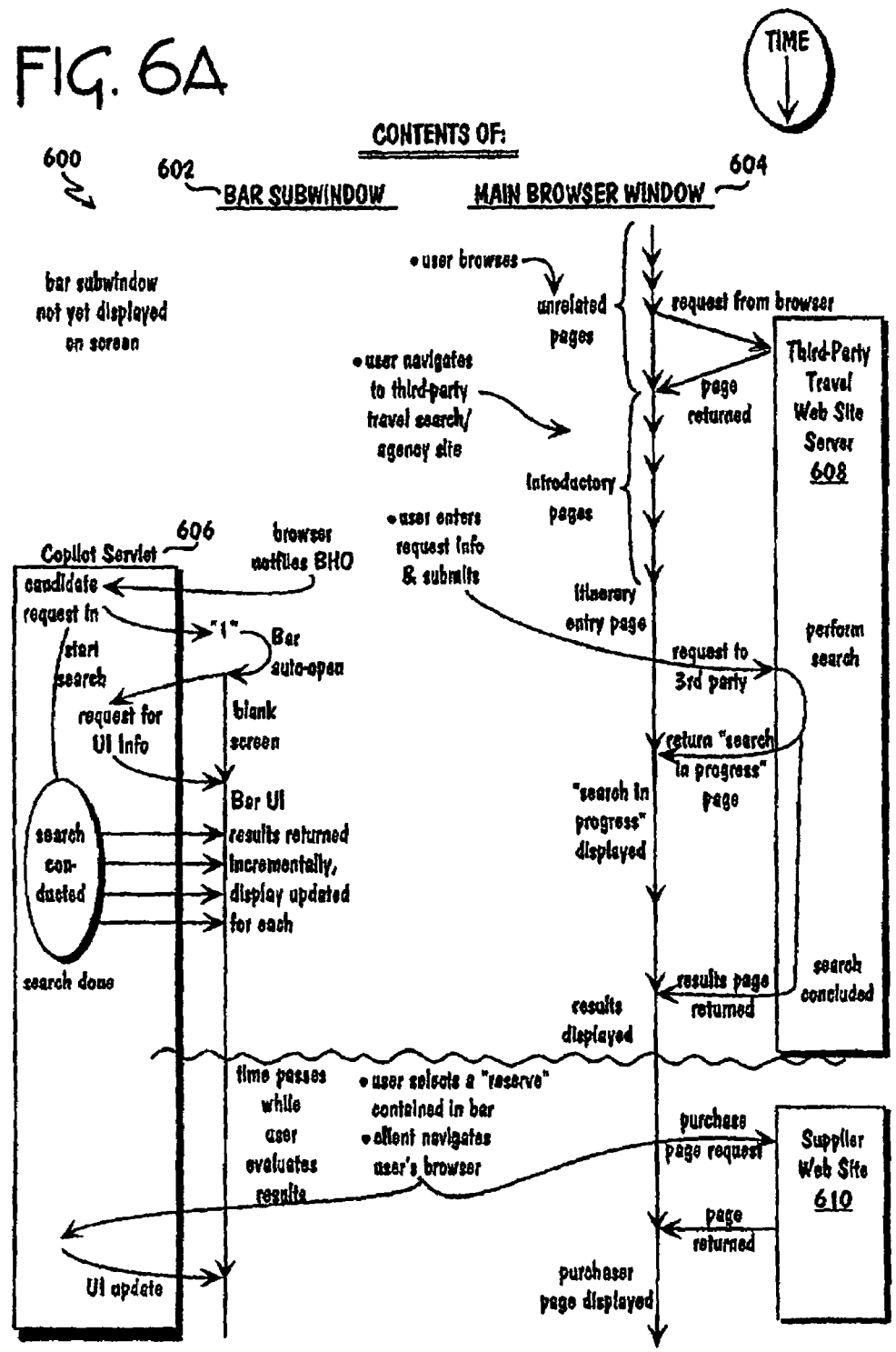
FIGS. 6A and 6B diagram user operation and information flow of a search system of an embodiment.
Figure 6B:
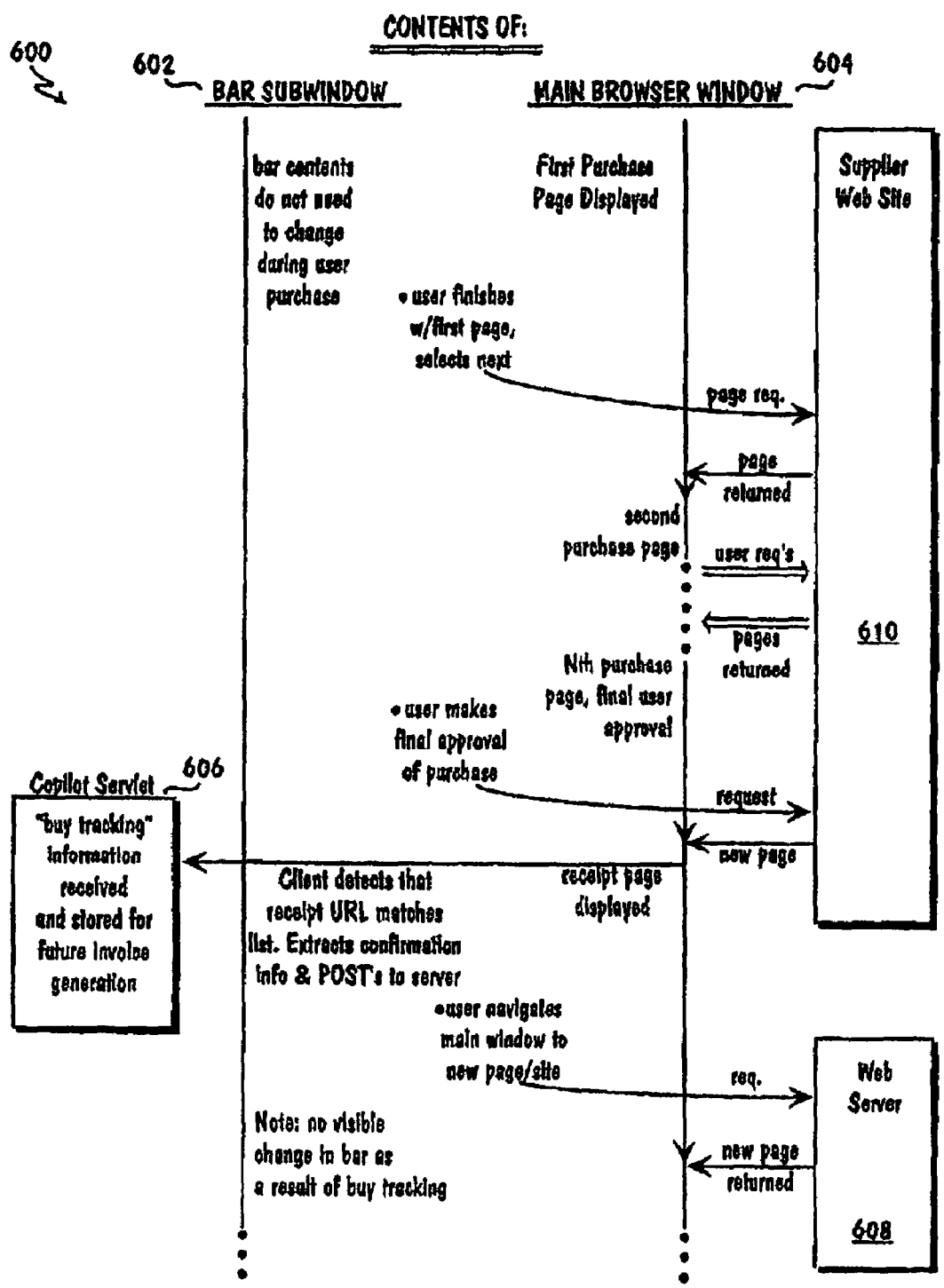

FIGS. 6A and 6B diagram user operation and information flow 600 of a search system of an embodiment. The information is transferred among a Bar sub-window 602 and a browser window 604 of a client computer, at least one component of a server system 606, at least one third party server 608, and at least one supplier web site 610. At the highest level, the transaction system locates and presents information relevant to a user request. In an embodiment, user requests include the itineraries for a potential trip, and the information returned includes available, purchasable travel alternatives that meet the requirements of the itinerary.

In an embodiment, the general flow of processing for each request or itinerary begins when the user enters itinerary information through the client user interface or through an itinerary-entry page of a web site. The itinerary information is transferred from the client to the server. The server reviews the itinerary information and determines the travel-suppliers that are most likely to have relevant and available purchasable options. The server couples to the appropriate systems of selected travel suppliers and makes queries about the available travel options matching the itinerary. The couplings to travel suppliers can be made numerous ways including, but not limited to, requesting pages from their web sites and extracting information from the pages returned as shown in FIGS. 6A and 6B, and using a proprietary connection intended solely for inquiries from the search system. When coupling through a proprietary connection, an intermediary can be used that also contains information about the travel supplier's inventory, for example a Global Distribution System (GDS) database.

The server returns boiler-plate data display and formatting information to the client. As results are received from each queried travel supplier, they are evaluated and processed for possible transmission to the client along with search progress status information. When all results have been received from the queried travel suppliers, final "search complete" status information is sent to the client.

The transaction system of an embodiment automatically detects and interprets user requests for relevant types of information. In contrast, most existing information search systems require the user to explicitly provide their request to the system, typically by entering information into a web page. While this is also an option in the transaction system, the transaction system is also capable of detecting other user actions and interpreting them as implicit requests for information.

When examining user actions to determine if a search operation can be started, information is accumulated from a sequence of actions up through a final trigger event. For example, if a user has entered information on a web page, or in a sequence of successive web pages, the triggering event might be the activation of a submit-type control on the final page. However, the system can use all of the entered information to determine if the final user action (the submit) should be used to start a search.

However, this example is neither the least nor most complicated instance of monitoring user actions that might be used in the system. Other examples of user actions/input that might be used include, but are not limited to: detection of the selection of a single control or sequence of controls that indicate an interest in a supported type of information; entry of information by the user in a control or sequence of controls; entry of information through natural-language or N-gram techniques; selection of a pre-existing set of information as identifying the user's interest. It should also be noted that while most contemporary client systems are computer systems in which the user provides input through typing and/or pointing devices, any means of user input may be used with the search system including, but not limited to, handwriting recognition and voice recognition.

It is also noted that all methods for monitoring and evaluating user input may be applied to both user actions performed with respect to a third-party web site as well as an interface of the client system or web page maintained by the search system operator.

The monitoring of user activity, in an attempt to recognize actions that indicate a desire for the type of information that the system has been implemented to collect and present, is accomplished hierarchically, but is not so limited. The client is primarily responsible for monitoring user actions. The primary mechanism for this monitoring is capturing the user web browser requests for new pages, although other mechanisms could be used to achieve the same result or slightly different results for implementations designed to search for other types of information. The monitoring is accomplished through a Component Object Model (COM) interface. This interface captures each URL, or navigate event, that the browser is about to fetch.

The first step in determining if the user is trying to find information about travel alternatives is to compare the root portion of the URL with a list of strings maintained by the client. This list is stored in the Windows registry, a system database of configuration information, and can be updated by the server when it is out of date.

When a URL requested by the browser matches one of the partial URL strings stored by the client, the client forwards it (and possibly the associated data if the user's browser is making a POST request) to the Copilot Servlet portion of the server for further processing. The server determines if a particular user request is a request for travel information and contains enough information to be considered an "itinerary" that can be used for a search. While the simple string comparison against the URL is adequate for the needs of the travel-information searches, other embodiments may use a different first-level analysis of user operations, as determined by the complexity of the information needed to perform the search.

The transaction system also accommodates a user providing their request directly to the system with the entry of itinerary information into a web page. With this entry method, the user enters itinerary information directly into the HTML form that is part of the client user interface. This is possible either when the user has opened the Bar explicitly or after it has automatically opened in response to a previous user action/input.

In general, a session starts the first time after the client has stated a need to contact the server, and continues either until one of the systems timeout periods expires or until the user takes an explicit action that shuts down the client. The installation of an embodiment comprises several operations that generally occur the first time the client starts after it has been installed and/or the first time a new client installation connects to the server. In particular, when first installed on a system the client creates a GUID to serve as the client's permanent ID number. It is noted that the User ID (UID) is actually specific to a particular operating system installation rather than to an actual individual user.

The client attempts to make a connection to the server, starting a logical "session", only after it reaches a point where it needs information from the server in order to continue. The two cases in which this occurs are: the user explicitly opens the Bar causing the client to need the HTML/JavaScript source for the user interface to be displayed; and, the client detects the browser attempting to load from a URL that is a candidate for containing an itinerary, in which case the URL (and possibly associated POST data) must be sent to the server for further analysis.

As an optimization, the software checks for the existence of a connection from the client system to the Internet or other coupled network before attempting to communicate with the server. Since attempts to communicate with the server would fail in this condition anyway, this check prevents wasted processing and error-recovery.

The UID is not required to be strictly permanent. In an embodiment, the UID is stored in the Windows registry (a system database of configuration information) and therefore subject to accidental or intentional deletion. Each time the client starts execution, it checks for a UID in the registry, and if one is not present it creates one. It is this portion of the client that creates the UID after the initial installation so that installation is not actually handled as a special case. In the event that a client UID is destroyed and the client allocates another one, the only aspects of the system that are impacted are: the ability to correlate user operations performed with the old UID and those performed with the new UID; and, the ability to retrieve the user's previously selected/specified personalization options.

In the preferred embodiment, if the user provides personal information through the registration web page during the installation process, the client forwards it to the Start Servlet when it initiates contact. The server database records keyed by the UID also contain user personal information. This information can be manipulated by the user through the user interface presented in the Bar.

Personal information is used to control different aspects of the client behavior and of the server behavior toward a particular user. For example, the personal information controls whether a software client will be automatically updated if a newer client version is available. It can also be used to guide the information search performed by the server. For example, in the preferred embodiment where searches are performed for available airline tickets, the personal information can contain things like suppliers the user wishes to avoid, preferred ticket classes, senior citizen status, and other information that results in the availability of lower-cost fares.

In coupling to the server, a client creates a session identifier (SID). This is another 128-bit, universally-unique identifier. The SID is transferred in all future transmissions from the client that are part of the same session. The SID allows the server to distinguish semi-simultaneous requests made by different clients and between requests originating from different browser windows on the same client.

The first exchange between the client and server in a session is when the client performs an HTTP POST transaction with a destination URL that specifies the Start Servlet. This POST transaction transmits data including the UID, the SID, the personal information provided by the user (if it has not been previously transmitted), and the client's current version number.

In response to this POST, the Start Servlet returns several pieces of information including the version number of the latest client release, the version number of the lists of partial-URL strings stored by the client, and those items from the personal information associated with the transmitted UID that affect client operation. If the version number of the latest client release is larger (later) than the receiving client version number and the user has elected to receive client updates, the client undertakes downloading and installing the latest client version in parallel with subsequent primary operations. If the version number of the lists of partial-URL strings is larger (later) than the receiving client version number, the client downloads new copies of the out of date lists. These lists are used by the client to determine which URLs are candidates for itineraries and are to be forwarded to the server, and which URLs indicate the completion of a purchase by the user.

The Start Servlet also performs several internal housekeeping functions. It verifies that the supplied UID already has a matching record in the server database, and creates a record if it does not. It also creates a "Session Info" object which will persist on the server for as long as the session remains active.

Figure 7:
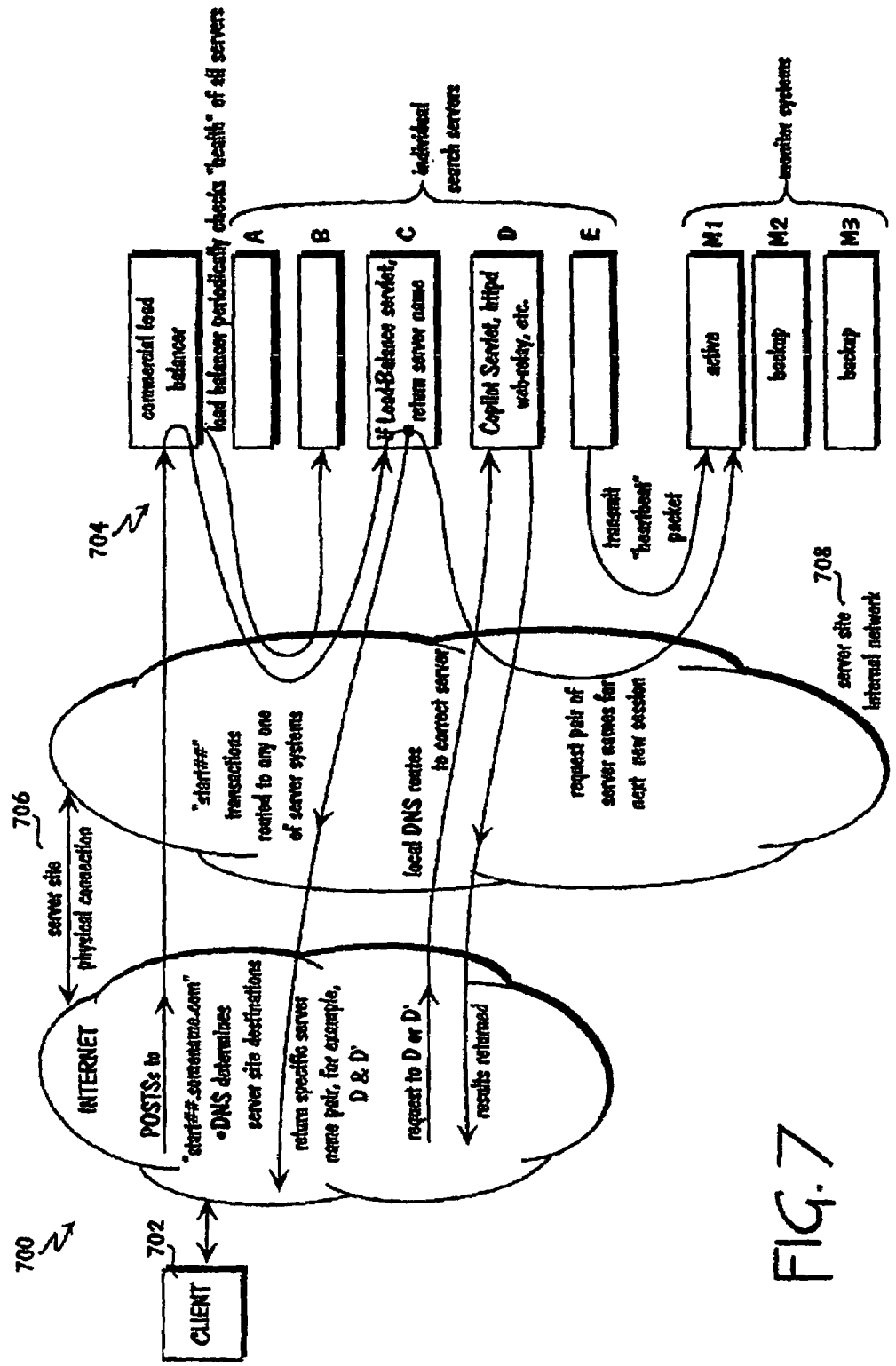
FIG. 7 is a block diagram of a load balancing arrangement of an embodiment.

FIG. 7 is a block diagram of a load balancing arrangement 700 of an embodiment. The client system 702 is coupled to at least one server site 704 using at least one network coupling 706, for example via the Internet. Load balancing is accomplished using a server site internal network 708 or backplane, but is not so limited. Alternate embodiments can use numerous types of couplings among the server components of the search system.

In order to ensure simultaneous availability to a large number of users, the server portion of the system is made failure-tolerant and is scaled to supply the processing power and network bandwidth necessary to support large numbers of simultaneous users. This is accomplished using a number of separate, hierarchical mechanisms including, but not limited to, DNSs, load balancers, round-robin techniques, and redundant backup monitor systems.

The system uses a dynamic two-level form of load balancing, but is not so limited. The first level of load balancing is accomplished through the Internet DNS service and directs traffic to various data centers around the world. Data centers are easily added or removed. The amount of traffic sent to each data center can be controlled to a level of approximately 1% of the total traffic.

The second level of load balancing balances the traffic within each data center (cluster) and uses a combination of typical load-balancing systems and system-specific balancing methods. This technique uses information including CPU and memory usage, network bandwidth usage, and number of current users of the individual CPUs in performing load balancing. A triple level of redundancy is built into the second level load balance.

Because the HTTP protocol is used for communication between the client and server, the client uses a specific server name to which requests are directed. For initial server contacts (exchanges with the Start Servlet and Load-Balancing Servlet), a server name is constructed dynamically by the client prior to making the first request of a session. The server name is created by concatenating a number of string fragments.

A first string fragment is a string constant representing the fixed "base" part of the server name. Any string that is a legal Internet host name could be used. In an embodiment, the base string is "start".

The next string fragment is a produced by the client. The client generates a random integer in the range 0 to 99, inclusive. This integer is converted to a two-character string.

Another string fragment includes a string constant representing the naming domain within which the server systems are located. In a preferred embodiment, the domain is of the form ".somename.com".

Assuming that the clients are implemented with a good random number generator, if a large number of clients are operating simultaneously, there will be a roughly equal number that have generated each of the 100 possible different server host names. There are several benefits to having effectively divided the set of active clients into a large number of differentiable categories based on the host name which they have constructed.

Regarding these benefits, it is important to recognize the capabilities of the network of DNSs that underlie the Internet and provide the translation between textual host names and numerical Internet Protocol (IP) addresses. First, even though different servers within a domain are logically related by the common parts of their domain name, there is no requirement that the corresponding IP addresses have any commonality or relationship. This allows, for example, the server identified by the host name "start00.somename.com" to be at an entirely different physical location from the one named "start01.somename.com".

Furthermore, multiple different host names may also be mapped to the same numeric IP address. This means that an entire block of hosts names, such as "start75.somename.com" through "start90.somename.com", and therefore a statistically-predicable portion of the total client traffic at any particular time, can be directed to a single server system/location.

Moreover, it is possible to modify the DNS mapping between host names and IP addresses. This allows the flow of traffic from some portion of the clients to be changed from one server to another without having to notify or directly communicate with the clients in any way. Further, because of the number of different host names that clients generate in an embodiment, the change from one server site/implementation to another can be performed gradually over time, with a resolution of approximately 1% of the total client traffic.

Once the client has determined a server host name, and DNS look-up has obtained the current matching IP address, the client attempts to establish an HTTP connection with the server IP address. At this point, an embodiment uses a typical load-balancing system to distribute the HTTP requests coming into an IP address across multiple individual server systems.

One aspect of an embodiment which is important in making it amenable to the use of typical load balancers: client HTTP requests made of the Start Servlet and Load-Balancing Servlet do not depend on any state stored on the server. This is important because with simple load balancing systems, there is no way to ensure that subsequent requests originating from the same client are directed to the same server without multi-processor support linking the various server systems. Note that while the SID is included in the data sent to these two servlets, the servlets do not make use of it for anything other than error-checking, because of the lack of session-to-server continuity present for these two servlets.

Only requests for the Start Servlet and Load-Balancing Servlet use the host name that is generated by the client and which is handled by the load-balancer. It is the responsibility of the Load-Balancing Servlet to provide a server host name that the client can use for all requests that depend on server state, which are directed to the Copilot Servlet.

Each set of server systems serviced by a typical load balancer is also associated with one or more monitor systems. It should be noted that this designation is logical rather than physical, and a single computer system could serve both as a front end server and as a monitor, as well as fulfilling other rolls, such as the database server. Monitor systems are responsible for: accepting periodically-transmitted loading statistics from each of the front ends; determining which front end systems have not reported statistics recently enough and which will therefore be considered "dead"; and, maintaining a circular list of the "not dead" front end servers, and returning the next server name from the list each time a server executing the Load-Balancing Servlet requests a server name to return to a client.

The monitor system is not responsible for notifying the load balancer of which servers are "alive" and "dead". Instead, the load balancer uses its typical mechanism, such as making periodic checks of each server's network responsiveness with "ping".

When a client is in the process of establishing a session it makes a new HTTP POST request to the Load-Balancing Servlet once it has received a response from the Start Servlet. The data sent with this request is the UID/SID pair. The Load-Balancing Servlet services this request by requesting the next available front-end server host name from the monitor system. It then returns the host name plus a set of configuration parameters to the client. The configuration parameters include, but are not limited to: a flag instructing the client whether to use clear (HTTP) or encrypted (HTTPS) communication with the server for subsequent transactions; the client timeout period for terminating a session due to user inactivity; and, the path from which a new version of the client can be downloaded by an existing client, which is used if the "latest client" version number returned by the Start Servlet is larger than the requesting client's version number and the personal information returned from the server for the current UID allows automatic updating of the client to occur.

The search system of an embodiment uses two separate host names that are DNS-mapped to the same front-end server. Thus, the system maintains two separate names for each front end server and returns the matched pair of names to the client. This configuration helps avoid delays in system responsiveness associated with WININET.

Within a Windows system, most HTTP requests generated by software running on the system pass through a standard Windows library that contains common, low-level functions that implement large parts of HTTP. This library is called "WININET". In typical web browsing, most pages displayed actually cause a large number of discrete HTTP requests, one for the HTML source of the page along with additional requests for each embedded object. Because the client user interface displayed in the bar is implemented as a heavily-scripted web page, changes to the bar's display generally also cause the bar's contained browser control to generate a number of HTTP requests through WININET to the client's assigned front-end server.

In order to optimize network bandwidth utilization, it is common for typical systems to start multiple HTTP requests simultaneously. WININET is no different and is also capable of processing several requests in parallel. However, the details of its implementation cause it to place a cap on the total number of requests that can be simultaneously active to the same internet domain name. When software (IE, a browser control, or a client) issues a larger number of requests than this cap, WININET queues all but the first requests and starts them sequentially as in-process requests complete. In normal web-browsing operation, this leads to a relatively high-performance system.

However, HTTP requests generated by the client consist not only of fetches for elements of the client's user interface but also exchanges of control data (candidate search requests, purchase requests, transactions for session opening, closing and "keep alive", etc.). It is possible for the bar to need to exchange control information with the server while a user-interface update/reload is in progress. If this occurs, WININET may queue the control transactions behind the (typically larger and much less important) UI data fetches, causing a perceptible pause in the system's responsiveness to the user.

A search system of an embodiment based on WININET overcomes this problem by having two separate server names for each physical server (IP address) within a server site. When this name pair is returned to the client by the Load Balance Servlet, one name is subsequently used for most URLs used to update the HTML displayed by the bar and the other is used exclusively for control transactions (usually POSTs to the Copilot Servlet). Even though both logical names evaluate to the same IP address when a DNS lookup is performed, WININET's cap for the maximum number of pending transactions is implemented in terms of the logical name only, so that it treats the two server names as entirely independent and each has its own cap, even though they are physically the same device. Thus, the client ensures that control transactions are never queued behind user-interface updates.

Another benefit of establishing separate server names for the control and (static) data-fetching transactions is that the server sites could be reorganized, in the event that it provides a performance improvement, into a set of servers that serve only static data and another set that run the servlets but do not serve the static data. With the structure described, such a reorganization could be performed in any combination of server sites at any time and completely transparently to the client systems.

In a group of front end servers, provision is made for there to be multiple monitor systems. Each front end has a list of all the available monitors. If the monitor at the top of the list stops responding to the transmission of loading statistics or to requests for front end server names from the Load-Balancing Servlet, then the front end server will move on to the next monitor system on its list. In this way, if a monitor system fails, the associated front end servers will gradually change over to using the next, or live backup, monitor system.

While an embodiment uses a round-robin scheme for allocating new client sessions to the available pool of front end servers, a more complicated algorithm can also be employed. Each front end server sends a variety of loading information to the monitor server approximately once per second. This information is collected to provide statistics on the system's over-all operation, but could also be used as the input to a more complicated, dynamic algorithm for determining which front end server should be assigned a particular client session.

For example, an alternate means for determining the server to which a particular new session is to be allocated takes into account the total number of active sessions on each server. The round-robin mechanism is modified so that it allocates a session to a server only if that server already has fewer or the same number of active sessions as the server with the most active sessions.

In an embodiment, a typical Java Virtual Machine and execution environment known as "Tomcat" is used to execute the servlets on the server systems. As part of Tomcat's initialization process following the boot-up of a server system, the server registers itself with the first monitor system on its list that will respond.

On each front end server is a process that periodically executes, collects performance and loading data, and transmits it to the current monitor system. This process executes at the rate of approximately once per second so that the transmission of performance data acts as a regular heart beat from the front end server that can be anticipated by the monitor system. The performance data packet transmitted by the front end server heart beat includes information about the server CPU usage, the current free memory of the system, and the number of database queries that the front end has generated in the last second, but is not so limited.

It is noted that rather than having two separate servlets and transactions to initiate the connection between the client and server, an alternate implementation combines the functions and responsibilities of the Start Servlet and the Load-Balancing Servlet into a single servlet. This is possible because the client does not need any of the information returned from the Start Servlet in order to create its POST to the Load-Balancing Servlet. This alternate embodiment, thus, could provide an improvement in overall system performance because only a single client POST of information would be required and the servlet could return all of the necessary information in one response.

The client of an embodiment maintains numerous lists of strings that it uses to compare with the contents of different URLs. These lists can be updated from the server. These lists are stored in the Windows registry, although any persistent client storage could be used as effectively.

As discussed herein, the search system automatically opens the Bar on the client browser and displays information relevant to the user's current activity. One of the string lists maintained by the client contains partial URLs that the client matches against the URLs from which the user's browser attempts to load. When a URL matches, the client forwards the user browser request to the server for further checking. This hierarchy serves to reduce the amount of client/server bandwidth that is consumed by monitoring URLs without unnecessarily complicating the operation of the client.

Another list of strings maintained by the client is used as part of the mechanism for monitoring whether the user makes purchases from the web sites of travel suppliers to which the system directs them, referred to as "buy tracking". This list contains a pair of strings for each entry. The first string in the pair is the URL of a page on the travel supplier's web site to which users are directed on the completion of a purchase, typically a "receipt" page.

The second string in the pair is an extraction specifier. The extraction specifier can specify the extraction of multiple distinct portions of a receipt page, including specifying a particular region/string within the receipt page that should be extracted and transmitted back to the server. The extraction may occur over a sequence of pages if the necessary purchase identification information is found in more than one page. This string is typically a piece of data that uniquely identifies the purchase transaction. This can be used as proof to the travel supplier that the purchase transaction originated from a referral by the search system. This can also be used as the basis for a payment arrangement between travel suppliers, or other information suppliers, and the maintainer of the search system.

When the client makes a request to the Copilot Servlet it forwards a URL from the browser along with any associated POST data. The server response is an HTTP response packet containing either: a single string "0", indicating that a search cannot be performed based on the data transmitted and that there will not be more data from this request; or, the string "1", indicating that a search has been started based on the data within the request. In this case where the search has been started, the "1" is followed by the HTML and JavaScript source for the display of search results, followed by the results themselves.

The Copilot Servlet of an embodiment sends the processed search results to the client as they become available, along with status about the progress of the search. The client receives the total number of travel suppliers that are to be searched, the number that have returned responses to the server search requests, and the total number of data items that have been found, processed, and sent to the client. This status information is displayed for the user as it is received, in order to give the user the sense that things are progressing rapidly. This almost-immediate feedback to a search is a point of novelty in the search system.

An area within the Bar is used to display a vertically scrolling list that presents summaries of the search items found. The items are placed into this list based on a user-selected sort order. For example, the display of airline flights for an itinerary can be sorted based on the ticket price, the number of stops, departure time, arrival time, trip time, or supplier. Note that the particular criteria on which the records can be sorted is less important than the fact that the records can be sorted based on a user-selected criteria and that the sort is performed on the client so that the system responds quickly to the user changing the sort selection for a progressing/completed search.

In order to ensure that user expectations are set correctly, and to prevent resources from being leaked, or allocated but not recovered for reuse, the client and server both track numerous types of time out periods.

The JavaScript that executes within the client Bar of an embodiment starts a time-out down counter each time a user action begins a new search. This counter is used to control the period of time in which the search results are considered valid, an important consideration when dealing with travel bookings, including airline tickets. As search results expire, any electronic links provided to the associated supplier over which the associated travel item or component could be reserved or purchased can be deactivated, but the system is not so limited.

Since airline ticket pricing and availability fluctuate rapidly, it is important to prevent the user from deciding to purchase a ticket after it becomes unavailable. To prevent this, the JavaScript waits for a period of several minutes after the START of the search. After this period, it notifies the user that the results are no longer valid and deactivates the purchasing controls associated with each result displayed.

The time out period of an embodiment is approximately 10 minutes, but is not so limited. However, this period must be closely related to the individual times that the travel supplier systems will hold a reservation for purchase after they respond to a query. Therefore, the period is likely to be radically different in systems designed to search for different types of information, as well as having to be updated from time to time within an embodiment. Because the timeout is within the JavaScript code, which is downloaded from the server each time the Bar is opened, it can be easily changed independently of having to create and distribute new clients.

This time-out is not needed in a system configured to search for information that is not time sensitive. For example, a system that searches for purchasable goods with rapidly-varying inventory levels would presumably use a time-out period to invalidate search results after some reasonable period. Alternately, a system that searches for reference information or for purchasable goods that are made-to-order (and which therefore do not have finite inventories) would not have to use a search-results time out. In another alternate embodiment the same user action triggers simultaneous searches for all available sub-categories (e.g., air, hotel, car) of the supported type of information (e.g., travel reservations).

Separate searches can be performed by the user for airline reservations, rental car reservations, and hotel reservations. The user selects among these three sets of search results using tab controls displayed in the Bar. The client-side JavaScript is capable of maintaining separate sets of search results for each category, and has a separate time-out counter for each. It is therefore possible for the user to search for all three types of travel reservations, and for them to switch back and forth among the different result displays without interfering with the separate expiration counts on each set of search results.

Because sessions consume server-side resources, it is important to ensure that they do not persist and remain open indefinitely, as idle sessions would eventually accumulate and clog the server systems. As such, there are three mechanisms for closing sessions and allowing the associated server resources to be freed.

In one mechanism for closing sessions, the client may be explicitly turned off by the user closing related instances of their web browser. When this happens, one of the shut down operations performed by the client is to send a POST to the Copilot Servlet informing it of the end of the session. On receipt of this message, the servlet frees its session-specific resources.

In another mechanism, the client monitors user actions. Each user action performed that is related to the client's operation is used to reset a time out down-counter. If the user does not perform any operations before the time out expires, the client closes the session and notifies the server of the fact. In an embodiment, the timeout for this period is approximately 30 minutes, although it could be adjusted substantially without significantly compromising the system.

One other mechanism uses a server time out counter. This counter is reset by each transmission from the client. If the timeout period elapses, the server assumes that something has happened to the client, such as an unanticipated loss of power, and frees the resources associated with the current session ID (SID).

In the unlikely event that the server times-out a session which is still active on the client, subsequent client transactions with the timed-out SID will still be honored so as not to frustrate user actions. Instead of rejecting the unexpected SID, a new server object is allocated for the SID and, since the occurrence of this condition could indicate an unauthorized attempt to access the system, the fact that it occurred is logged.

Each item or purchasable travel reservation that is found and reported to the user by the search system of an embodiment is displayed along with a "reserve" user-interface control or icon. When the user activates this control, the client directs the user's web browser to the particular page of an associated supplier web site from which the user can complete the purchase of the selected item.

The complexity of and mechanisms for performing this hand-off depend on how the information was originally gathered from the supplier and on the structure and features of the particular supplier system. There are three general categories into which the different interfaces between the system and the suppliers can be grouped.

One system gathers information using a special-purpose interface between the system and the supplier servers. Another system gathers information by accessing a third-party database which contains information about the supplier. Still other systems gather information from suppliers through a web site designed primarily for direct interaction with individuals using web browsers.

When a special-purpose interface is used between the search system and the suppliers, part of the interface design includes the creation of a mapping between the information returned and a point (URL) within the supplier's web site. Thus, the majority of the burden of ensuring that the supplier web sites can easily produce a "purchase" page for each item that may be returned by the supplier servers over the special-purpose interface is assumed by the supplier.

When a third-party database is used, the system should be capable of causing the supplier web sites to generate a purchase page corresponding to the user selection. In the simplest case, this entails creating a URL within the supplier web sites that contains information identifying the user selection. If the supplier web sites are not structured to use URLs that can be composed directly, then the system will have to generate a sequence of accesses to the supplier sites on the user's behalf in order to reach a point at which an appropriate purchase page is available.

This process is performed by a server component that is designed specifically to interface with a single supplier web site. In general, a system component that is designed to manage the interface to a single external system will be referred to as an adapter. The system of an embodiment uses several different types of adapters in order to normalize different types of interfaces to external systems as discussed herein. Search adapter is used herein to indicate a server component that gathers information about a supplier's offerings. Reserve adapter is used herein to indicate adapters that generate queries to a supplier web site in order to ensure the existence of a purchase page corresponding to a user selection.

It is possible that, in the cases where a search adapter interfaces with a system other than a supplier web site, that the supplier actually does not have a web site that can be accessed by the user to make purchases. In this case, an alternative means for performing the purchase if the user selects an item returned by that supplier must be available. The preferred arrangement is for the owner of the search system to have a parallel and related travel-agency web site that can be used to purchase reservations for those suppliers that cannot support their own purchases.

The most potentially-complicated case is the one in which information is gathered by a search adapter making direct requests from a supplier's web site/server which is designed to provide a human-usable interface. It should also be noted that many of the considerations for this case also apply to the operation of reserve adapters, as both reserve adapters and search adapters (that access a web site) can generate a unique state within the supplier web server to which the user's web browser must be given access.

In one case, the supplier web site is designed such that all of the information that the supplier server requires in order to generate a purchase page is encoded within the purchase page URL. When this is the case, the user's web browser can be directed to the correct purchase page simply by the client instructing it to navigate to (load from) that URL. In the system of an embodiment, the URLs for each purchase page of this type are transferred from the server to the client along with each search result item, so that the client can provide the "reserve" control's functionality completely without further client/server interaction.

In another case, some or all of the information required by the supplier web server to generate the desired purchase page is stored in cookies that are set when a previous page of the search sequence is returned by the web server. For example, when a search adapter interfaces to a supplier web site, it is common that, because of the supplier web site design, the adapter has to access several pages of the supplier web site in sequence, possibly emulating the operations of a human user filling out a data-entry form at one or more steps of the sequence. Along with the source for each web page returned to the search adapter by the web site there may be one or more cookies. Because the adapter is interacting with the web server as if it were a web browser, it stores each cookie returned by the web server and transmits it back with the next request. However, since the web server depends on the values stored in the cookies in order to generate the correct pages, the cookies have to be transferred from the server to the user's browser when the "reserve" control is activated.

In an embodiment, all of the cookies set by all of the web servers from which items were found are transferred to the client along with each data item. They are stored in the client and then, if the user selects a data item with associated cookies, the cookies are set in the user's browser prior to it being navigated to the associated URL. In addition, if the purchase page of the supplier web site is accessed using a POST transaction instead of a GET, the client is also supplied with a copy of the POST data created by the server for accessing the correct page. Thus, the client can execute the hand-off to a supplier web site on its own, without further interaction with the system servers.

There are some supplier web servers that are sensitive to the specific client (via testing the IP address or other mechanisms) from which they are accessed. Because of this, it is not possible for the client web browser to access the same supplier web pages that are searched by the adapter. To provide users access to purchase pages provided by this type of server, the system server includes a proxy capability, referred to as web relay. When the user selects a "reserve" control associated with a data item returned by such a server, the user's browser is navigated to a special URL handled by the system web server. The relay servers then fetch the matching pages from the supplier sites and present them to the clients. In order to provide a seamless navigation experience for end users, all subsequent navigation is routed through the relay servers because the user's session information related to a particular supplier is possessed by the servers rather than the user's client (browser).

For performance reasons, every navigation event is not routed through system relay servers because this generates too high a volume of traffic on the servers. Therefore, the system limits relay to only those URLs within the same supplier domain. But, if needed, every navigation can be routed through the relay servers for the entire Internet.

A simple implementation of web relay/proxy could be created in which all operations are performed by the relay server and it operates only by identifying URLs contained in web pages and replacing them with URLs pointing to the relay server. However, given the complexity of modern web pages, especially dynamically generated pages, it is very difficult to fully anticipate where all of the URLs might appear within the pages. For instance, some URLs will likely be within well known HTML tags, but others can be within quotes as part of a string inside of scripts, where the string can be referenced later in different parts of the page.

In order to correctly handle web pages in which the URLs identifying navigation destinations are difficult to statically detect or are created dynamically within the page, the system of an embodiment uses both the server and the client to detect URLs that should be rerouted through the web relay. The client can capture all of the navigation events created by user actions in the main browser window before the browser actually begins to fetch data from the target URL. The client can then modify the URL to route the navigation to the relay server before allowing the main browser window to fetch data. By modifying the URLs in this manner, the client also lightens the server load and improves system performance by requiring less extensive web page processing when the relay server forwards pages from the supplier web site to the client. Another important feature of this system is that without the client side being present, the server is fully capable of routing the navigation on its own; in this case, it becomes a conventional relay server.

The system server/client web relay architecture consists of server-side preprocessing of web pages served and client-side real-time processing of navigation destination URLs. After a user selects a specific "reserve" user-interface control, the server will try to determine whether the client side is prepared to route navigation events through the relay server. If the server detects that client web relay is possible, the server hands off the responsibility for routing navigation through web relay to the client, and merely fetches (proxies) requested pages. If the server does not detect that the client can modify navigation URLs, the server scans each fetched page and processes all of the URLs in the page (as best it can) before serving it to the client.

The client portion of web relay relies on the web browser forwarding navigation events to the client, and the client's capability of capturing these events before they actually cause data to be read from the Internet. After capturing these events, the client redirects the browser navigation to the system relay servers with all of the necessary data. Then the relay servers fetch the correct pages from the supplier web site and send them back to the client. The main advantages of using the client to modify/redirect URLs are that the client is theoretically able to catch all destination URLs used, regardless of how they are stored in a web page or when and where they are actually generated, and that distributing the processing required for redirecting URLs greatly relieves the processing load on the relay servers.

An embodiment of the relay client is implemented specifically for Microsoft Windows operating systems and the IE web browser. It uses the COM ActiveX interface provided by IE to intercept and modify navigation events generated by user actions in the main browser window. In general, any environment that provides a mechanism to capture and modify user navigation events could be used.

All of the functionality of the relay client is realized in an ActiveX browser helper object (BHO). The BHOs run in the same memory context as the browser and can detect any operation on the available windows and modules. In an implementation, the relay client functionality is integrated into the same client BHO that contains the other portions of the client. However, the client functionality related to web relay can also be implemented in a separate BHO. The events that the BHO handles for the client portion of web relay include, but are not limited to, BeforeNavigate, NewWindow, and Document Complete.

In the BeforeNavigate event, the client captures the navigation events, checks whether the browser destination URL is already rewritten to point to the relay server. If not, and the URL does indicate the relayed supplier web site, the client rewrites the URL, cancels the current navigation, and initiates a new navigation event with the rewritten URL. Care should be maintained with the cancellation method used and, in so doing, the client maintains the original URL of the currently displayed document so that the client can anticipate and correct the problems.

Special care is also used with supplier web pages that employ frames. A frame-organized display in a web browser is accomplished using one page that contains a frameset definition and URLs indicating the initial content for each frame of the frame set, and the separate pages identified by these URLs. Handling of framed displays is accomplished by having the client ignore the BeforeNavigate event and letting the page containing the frameset load, unmodified, from its original URL on the supplier web site. All of the subsequent navigation (loads) to the individual pages displayed in the different frames of the frameset are then processed by the relay functions of the client BHO.

An alternate method for handling relay of the pages that make up a frame-organized display is for the relay server to modify the URLs, contained in the page with the frameset definition, for the individual pages that fill the display frames. This would ensure that, from the browser's point of view, all of the page components reside in the same Internet domain (that of the relay server). This prevents the security "sand box" restrictions imposed on JavaScript executed within the pages by the browser's interpreter from interfering with the page having the same operation as it does when not relayed.

The NewWindow event has the client capturing the IEs new window creation event. When a user clicks a link in the displayed page that results in the creation of a new browser window, the client creates the new window itself so that it has fill control of the new window, and will receive subsequent events generated from that window as well. These windows generally are invoked by JavaScript URLs (or URLs expressed in other scripting languages supported by browsers). Therefore, in many situations, the URLs of the page intended to be displayed in the new window are not generated correctly due to the relayed location in the address Bar.

The client handles these cases by passing the parent page/window unmodified URL to the new browser window in order to recover (regenerate) the original (unmodified) URL of the new window, and subsequently issue a new navigation from the new window. Again, special care is necessary due to the differences in the various version of IE. For some older versions of the IE browser, the client cannot issue a new navigation during the event handling of BeforeNavigate for the new window. In order for the new window to be functional, the client allows the first navigation event to be fetched unmodified to avoid having the browser hang. This is done even if the URL for the navigation is wrong. Once the new window is open, the client can issue a new navigation with the correct URL after the previous navigation is complete.

The DocumentComplete event involves the client capturing this event to monitor the end of document loading in a browser window. If the client detects that this event occurs after the first document has loaded in a new browser window, the client verifies whether the loaded URL is the correct (relayed) URL or not. If the URL is incorrect, the client uses the current location (URL) of the parent (creating) window to reconstruct a valid, relayed URL. In an embodiment, the client and server are designed not to relay URLs used to load images and other embedded objects in the requested web page through the relay servers. These objects are instead loaded directly from the supplier web site. This is purely a performance optimization, and not a requirement for the system's operation. However, by avoiding routing of these objects through the relay servers, it is possible that the relay server may not obtain all of the necessary session information (usually stored in cookies) sent from the supplier web servers along with one or more of these objects (and not the pages forwarded to the client). Therefore, the client will check the cookie store in the user browser to make sure it finds and forwards back to the relay server all of the related session information.

An embodiment of the web relay server is implemented using Java Servlet technology like the other server portions of the system. And, like the other servlets, the implementation of this system is not limited to any particular programming language or even to a software implementation. The selection of Java is to conform to the rest of the system. Any server technology should be able to fulfill this task. When a request comes into a web relay server, the server first fetches the SessionInfo object (the same as used by the Copilot Servlet) stored in the system based on the specific UID and SID. This SessionInfo object contains information related to the particular user session, including context information generated by search adapters accessing supplier web sites. The relay server then retrieves the information from the Sessioninfo object related specifically to this request, for instance, the cookies with the same domain as the requested web site. Also, the relay server handles session information sent with the request from the client, if any.

The relay server then makes a request, on behalf of the user browser, to the supplier web site. After the server fetches the requested page, it checks to see if this page is originated from the same location specified in the request or if the request was redirected to a different location. The redirection can happen in three different cases, individually or in combination: the redirected location is at a different security level, for example, from http to https or vice versa; the redirected location is at a different domain; and, the redirected location is at the same domain but at a different path.

In the first case, the relay server has to reopen the connection with the user browser using the correct (new) protocol to avoid introducing a security hole in the client/supplier communication link. In the other cases, the returned page can have relative URLs that need to be resolved based on the redirected location rather than the original location, so the client responds by sending a redirection to the user browser to make sure that all objects in the page are loaded correctly and that the subsequent navigations from this page have correct URLs.

For performance considerations, if any or all of the above cases occur, the relay server caches the fetched page so that when the client subsequently issues a new request based on the redirection, the server can forward this page immediately without fetching the page from the supplier web server again.

After completing these steps, the server is ready to process the requested page. The relay server first checks whether the client is actively modifying relayed URLs. The relay client informs the server of its presence/activity by turning on the relay start switch in the page requests to the server. If the client is relaying, the server skips scanning and modifying the URLs in the page. Otherwise, the relay server processes the page contents received from the supplier web server, tries to find all the URLs possible in the page source, and modifies them so that they all point to the relay server.

While there are a number of business models supported by the system of an embodiment, and several different revenue streams that it could provide, the system is financially supported by payments received for each user purchase of travel reservations that occur as the result of the system referring a user to a travel supplier web site. Therefore, the system generates reliable records of user purchases supported with information that the travel suppliers will acknowledge as proof of purchases.

The portion of the system operations involved with detecting and logging user purchases is referred to herein as buy tracking. As discussed herein, the client stores a list of strings, periodically updated from the server, that are used to determine which user actions are considered user purchases. This list contains two strings per entry. One string is the URL of a supplier web page to which users are directed following a successful purchase. The other string is an extraction specifier containing instructions to the client as to the data that should be extracted from the page with the URL and POSTed to the Copilot Servlet.

In operation, a user purchase transaction begins with the user being presented with a list of different travel options that the system found from a number of suppliers. The user selects one of the presented options with the "reserve" control presented in the client Bar. The client navigates the web browser to a purchase page on the selected supplier web site. In an embodiment, the user directly interacts with pages of the supplier web site, sometimes providing personal and/or payment information. Upon completion of the purchase, a supplier web site may deposit the user on a "receipt" page that contains some type of purchase tracking information, such as a confirmation number or order number, but is not so limited.

The client receives each URL that the browser attempts to fetch from the network. These URLs are compared against both of the URL lists that the client maintains. When the browser has navigated to a receipt page of a supplier web site, the page URL matches the buy-tracking list of URLs. In response to this match, the client interprets the extraction specifier string associated with the URL, and uses it to extract a string from the web page content received by the browser from the supplier web site. The extraction specifier of an embodiment is created such that this string will contain the confirmation number (or equivalent) for the purchase. The client POSTs the UID/SID, the URL within the supplier web site, and the extracted string back to the server where it is logged and used to create an invoice for the supplier.

It is noted that the actual URL strings maintained by the client need not be exact/explicit URLs, but instead can be templates or regular expressions that match a family of actual URLs. This is convenient because some web sites incorporate user-specific or transaction-specific information in the URL which is not significant to identifying the pages that are receipt pages.

A significant aspect of the system's design is that, even though the client is integrated with the web browser, the system does not depend on the web browser to store state in cookies. Note that this is different from the cookies that the system places with the web browser on behalf of a supplier web site. Ignoring this type of cookie, which is used only for those particular suppliers whose web sites require it, the system does not need to set any cookies.

Instead, the state used in system operation is stored in a number of locations, but is not so limited. One location where state information is stored is in the server, in the data-structure allocated for each SID. Further, state information is stored implicitly in the web pages (HTML and JavaScript) displayed within the Bar. Each time the server (Copilot Servlet) returns content (such as user-interface information or search results) to the client for display in the Bar, the Bar retains that information. Thus, any information that is filled in to the page content sent to a specific client is implicitly stored in the client and is not required to be retained on the server.

In operation, the client/server system of an embodiment generates a significant amount of information, about the behavior of both users and suppliers. This information is reliably retained so that the correct operation of the system can be verified, the system can be further tuned/improved, and because comprehensive data about buying and selling habits is an asset of significant value.

At the most basic level, a significant amount of data is logged simply by the HTTP server (httpd) processes running on each of the server systems. Because HTTP protocol is used for the communication between the client and server, the httpd is responsible for determining whether each incoming request should be routed to one of the servlets, whether it is for a static piece of data (such as a graphic used by the client user interface displayed in the Bar), or for a page proxied from a supplier web site through a web relay. Thus, each request from a client passes through an individual server system httpd and is logged, including some performance information and the response code the server returns to the client. In addition to the logging of transactions as they go through each server, the Copilot Servlet also logs each request that is generated to a supplier, and all of the responses to that request.

For the server internal couplings between the servlets and the database servers, the search system uses a form of database connection pooling for all database connections. Opening and closing connections to a database is an expensive operation. In order to improve performance, connections are created once and inserted into a pool. When the system requests a connection it is delivered from the pool. When the connection is released or no longer needed by the system, it is returned to the pool.

Figure 8:
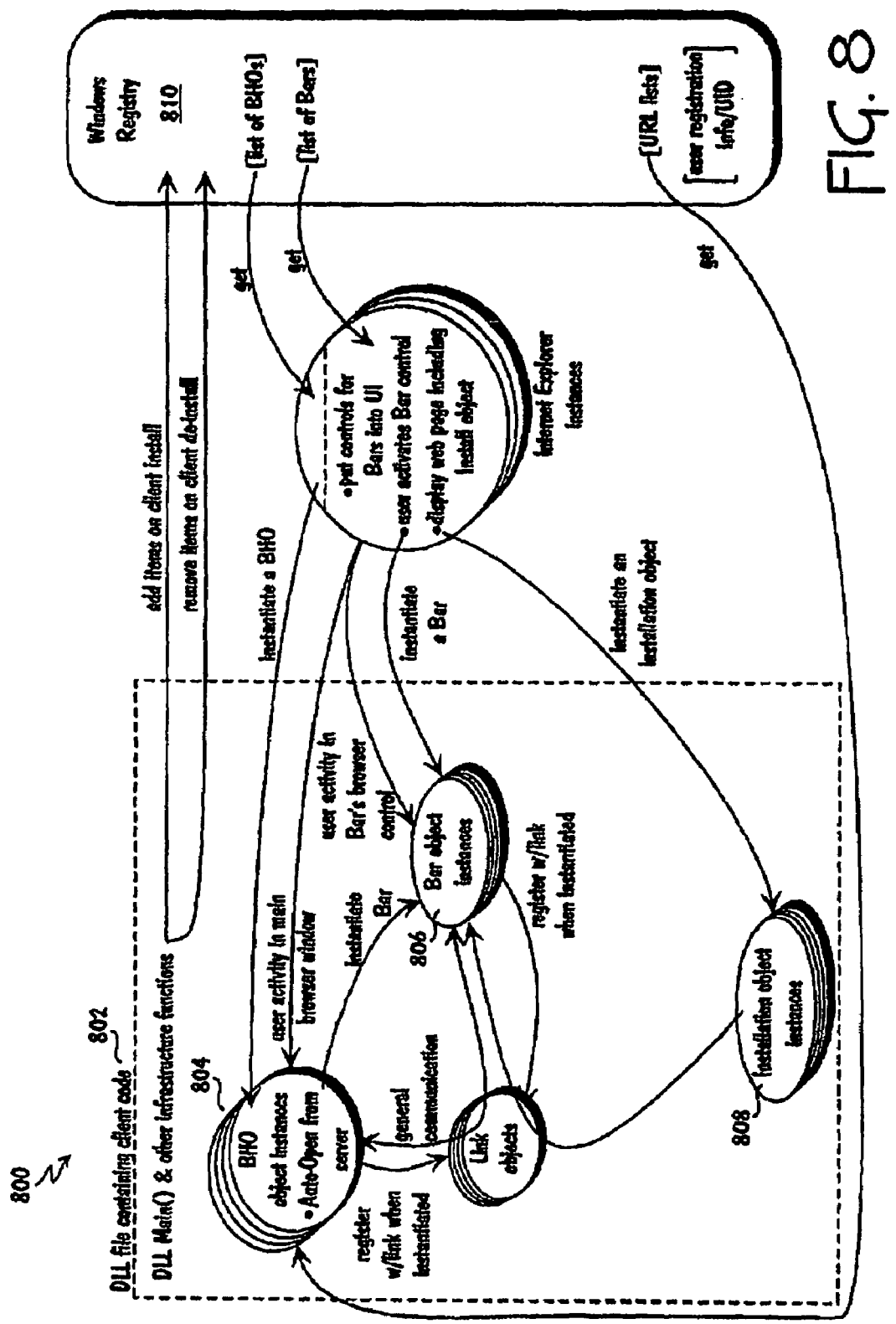
FIG. 8 shows a client system organization of an embodiment.

FIG. 8 shows a client system organization 800 of an embodiment. The client is implemented for Microsoft Windows operating systems and the Microsoft IE web browser, using the ActiveX and Component Object Model (COM) architectures/technologies, but is not so limited. As such, there are many other system environments in which the client could be implemented. The selection of the Microsoft-oriented environment for the client implementation is just a matter of economy and popularity (market-share), and does not implicate technological issues.

As discussed herein, the client is implemented as a set of COM objects that are packaged together in a single Windows DLL 802 for installation and use. There are three primary COM objects (objects that are assigned COM GUIDs and registered in the Windows registry 810) that make up the client: the Browser Helper Object (BHO) 804; the Bar object 806; and, the installation object 808. The division of the client into these primary objects 804-808 and the different minor (non-COM) objects is an artifact of restrictions imposed by the architectures of IE, COM, and ActiveX and has nothing to do with the underlying architecture or functions of the client.

The BHO is created to extend IE. When IE first initializes, IE searches a known area of the Windows registry for the GUIDs of registered BHOs. Internet Explorer creates an instance of each BHO that it finds, which includes the search system client BHO. When the BHO is created it couples to different portions of IE's COM interfaces so that it is notified of the user actions that must be monitored to determine if the Bar should automatically be opened.

After this initialization, the BHO monitors user actions until IE is terminated and the BHO is destroyed. Unless the BHO observes a match between a URL being requested by IE and one of the entries on the URL list, no other actions are taken.

Another task of the BHO is to manipulate the Bar object based on feedback from requests submitted to the server. For example, if the BHO observes a match between a URL the IE is requesting and the URL list, it opens a new session (if not previously accomplished) and forwards the requested URL to the Copilot Servlet for further checking. If the Copilot Servlet returns a "1" string, indicating that it has started a search, the BHO creates a Bar object and opens the Bar sub-window on the screen if it is not already visible. Further, alternate embodiments can implement other return codes or strings that result in other types of actions.

After this, the BHO receives a URL that references the client's assigned (via load balancing) front-end server. The BHO uses the COM interface with the Bar to cause the Bar to load from the specified URL, which gives the Copilot Servlet the opportunity to transmit the HTML and JavaScript that form the client user interface. Subsequently, each time a new set of content must be sent asynchronously from the server (e.g., not at the request of the user or the JavaScript executing within the Bar) the BHO will again cause the Bar to navigate to the new, server-supplied URL.

Additionally, with the help of the Bar, the BHO is responsible for implementing the client-side session time out counter. The BHO maintains the counter, resets it when it detects relevant user activity (based on IE's navigating to new URLs at user requests), transmits the end-of-session message to the server when the counter expires, and receives "reset counter" messages from the Bar when the Bar detects user activity (such as manipulating controls within the HTML user interface displayed by the Bar) of which the BHO is not directly informed.

As part of managing the session time out, the BHO also periodically provides messages to the Copilot Servlet informing it that the session is still in active use by the user. This prevents the server from timing out the session in the case where the user is performing actions that are entirely local to the client or that involve only a third-party or supplier web site and which, therefore, do not cause the client to send requests to the system server.

Like BHOs, Bar COM objects are treated as a special type of extension by IE. A Bar object can be listed in the Windows registry in such a way that IE automatically creates toolbar buttons and menu entries that correspond to the Bar. When the user selects one of these Bar-specific controls, IE automatically loads and initializes the Bar COM object, so that the Bar appears as a sub-window in the left hand side of the IE window.

In an embodiment, the Bar object is capable of detecting whether the BHO object has already been created and initialized, or not, and of creating the BHO object if it does not already exist. While this should not be necessary, there are some cases where the BHO does not get created correctly when IE starts. Therefore, the Bar's ability to create the BHO ensures a working system at least from the point in time where the user explicitly attempts to open the Bar.

The Bar is responsible for the user-visible and user-interface aspects of the client. However, there is actually very little software involved in this aspect of the client because the Bar object takes advantage of the browser control COM object that IE makes available. Essentially, instead of actually drawing and managing a user interface itself, the Bar object takes the area of the display screen for which it is responsible and fills it completely with a browser control. The browser control behaves exactly like a web browser application, interpreting HTML, JavaScript, and all other data types supported by the IE installation, except that the browser control takes commands from the Bar software instead of having a user interface for them. This structure allows the user interface of the client to be rapidly implemented, easily modified, and easily updated because the complete user interface is fetched from the server on a regular basis, just like any other web page viewed.

Just as the BHO receives notification of user events that occur as the result of user actions in the IE main window, the Bar object receives notification of user actions that occur within the Bar browser control. With most of the appearance and behavior of the user interface encapsulated in the "softest" portions of the client (the server-supplied HTML and JavaScript), the Bar object must perform only those portions of the client operations that require access to the operating system or an IE software interface that does not have a JavaScript-equivalent. Primary in this category are operations in which information or control is shared with the BHO, as there is no object in the JavaScript object model equivalent to either the generic, Microsoft-defined BHO interface or the BHO interfaces that are specific to the client implementation.

Figure 9:
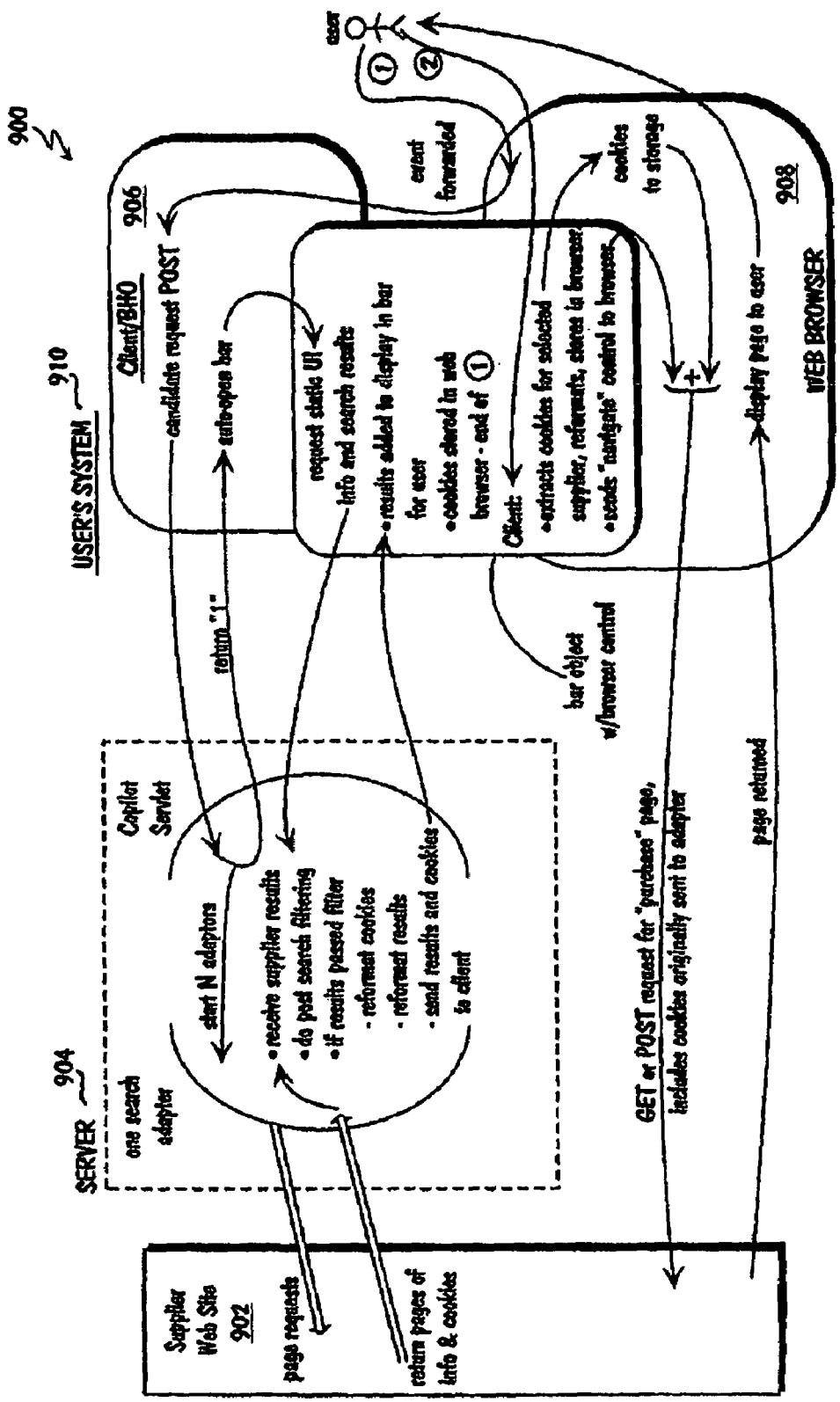
FIG. 9 diagrams a flow of supplier cookies of an embodiment.

FIG. 9 diagrams a flow of supplier cookies 900 of an embodiment among suppliers 902, system servers 904, and the client/BHO 906 and web browser 908 of user systems 910. It is noted that this flow diagram would be different for operational cases that do not use auto-open, that require web-relay for reserve/purchase, or that search a source other than a supplier web site. Another key function performed by the client Bar is the handling of several types of cookies, including: cookies originally provided to the system server (search adapter) by a supplier web site that was searched; cookies sent to the client from the server along with data items that originated on the cookie-generating supplier web site; and, cookies set in the browser if the user selects the "reserve" control for a data item with associated cookies. This is a non-trivial process because the normal behavior of a web browser is to note the Internet domain from which a cookie was originally sent and send the data for that cookie along with only those HTTP requests (GET/POST/etc.) directed to the same internet domain. In fact, IE will not accept cookies that are to be sent to a different domain than the one from which they are set. Unfortunately, when the server sets cookies by sending them along with HTTP responses to the browser control in the client Bar object, the browser control associates these cookies with the internet domain containing the search system server and not the domain of the supplier web server that originated the cookies. Because of this, if no other action is taken by the client, the cookie values will not be sent along with the HTTP request for a "purchase" page from a supplier web site.

In order to ensure that the cookie values originally set by a supplier web server to the search server (a search adapter executing as part of the Copilot Servlet) are sent back to the supplier web server when the web browser attempts to access it, the client manipulates the browser cookie storage directly. To make this possible, when the server sends cookies from a supplier to the client, it modifies the name of the cookie first, so that the revised cookie name contains the original name plus the text string identifying the supplier internet domain.

When they are received by the browser control, the cookies from the supplier sites are stored as if they originated from the search system domain. When a "reserve"(purchase) control in the client user interface is selected by the user, the client retrieves all of the cookies stored regardless of their original domains. The client then processes the cookie names to remove the originating-domain information (originally added by the search server before transfer to the client). An alternate embodiment has the client check each cookie to identify all cookies, based on their names, that should be set in the browser for the selected supplier web server.

In either embodiment, once the client has all cookies to be set, it processes the names to remove the domain information, and then calls an internal IE interface to set the cookies using the supplier web site domain as the domain to which the cookies should be sent. It is noted that the client does not "clean up" cookies that are stored on behalf of supplier web sites. Instead, if the user performs several searches, the cookies stored as the result of each later search replace the same-named cookies from earlier searches, so that the relevant cookie values are always current when they are needed.

An advantage of the cookie handling methods of an embodiment is its simplicity. By sending all of the cookies by the supplier web sites to the client along with their corresponding data items, in most cases the client can handle the user selection of a "reserve" control entirely on its own, without making a new request of the server. This means that in most cases the server can, after logging, discard all information and data structures related to a particular user search as soon as that search is completed, without having to coordinate with the client JavaScript's time out counter. The exception to this case is supplier web sites that are accessed from the web browser by web relay through the system server. For these types of sites, the server maintains supplier-specific information in order to perform the relay and fetch pages from the supplier web site.

An alternate embodiment of the system handles cookies by maintaining the list of cookies that match each search result on the server. The client then makes a separate request to the Copilot Servlet to retrieve the cookies when and if the user activates a "reserve" control.

Another alternate embodiment stores the cookies in the client in a different manner. For example, in the HTML that is sent from the server containing each data item found during searching is placed a block of JavaScript or HTML that includes the name/value pairs for all of the cookies associated with that data item. When the "reserve" control is activated, the JavaScript code executing within the Bar unpacks this list and provides it to the Bar object to be set within the browser. This method is preferred to having the JavaScript code set the cookies, as it avoids any difficulties with setting cookies so that they appear to have originated from a domain other than the one that originated the page setting the cookies.

There are numerous other objects used within the client that are not exposed to the operating system and IE via COM. The design of and partitioning between most of these objects is the result of simple implementation choices and has no bearing on the behavior of the system or client described herein.

One internal object, however, is of significance, although it would be unnecessary in an implementation of the client that did not use multiple COM objects. While it is possible for IE to create any of the COM objects that make up the client, and it is possible for the COM objects to create each other, it is very difficult to establish links between the COM objects that make up the client if IE creates more than one of them.

For example, in the most typical operating sequence, IE starts first, it then creates the BHO, and the Bar object is created later either by the BHO or by IE depending on whether it is opened automatically or explicitly by the user, respectively. Unfortunately, IE does not provide a mechanism by which BHO objects can find already-created Bar objects or vice-versa. As a result, the BHO has no way of knowing if IE has already created a Bar before the BHO needs to open it automatically. Additionally, if for some reason the BHO is not created automatically, the Bar has no way to determine this so that it can create the BHO itself Finally, with neither the BHO nor the Bar object being able to find the other through IE, it is difficult to establish the communication between the two objects that is necessary for the operation of the client without compromising the object-oriented nature of the COM architecture.

Therefore, the client uses a small and well controlled work around of the typical COM communication paths: the client contains a link object which, due to its design and implementation, both the BHO and Bar COM objects can find and which they use as an intermediary to communicate with each other. The details of the link object implementation depend both on COM and on the fact that the preferred embodiment is implemented in C++. In C++ nomenclature, the link object class contains a number of global methods (which, unlike normal methods, may be called by software that does not already have a pointer to a link object instance). These methods are used by BHO and Bar objects to place pointers to themselves onto lists maintained within the (single) link object instance, and to retrieve pointers to the other type of object (BHO pointers for a Bar, or vice versa) from the link.

At this point it is noted that because of the way IE is implemented and how it handles the case in which the user opens multiple IE windows simultaneously, it is possible for multiple client BHO and Bar objects to be created on the same user system, and for some of them to be in the same address space while others are in different address spaces. Due to the implementation of the link object, there will only be one link object in a particular process address space, regardless of how many IE windows, BHOs or Bars IE creates within that address space. Each instance of a client BHO or Bar object registers itself with the single link object in an address space and can therefore access all of the other client objects. Multiple, independent process address spaces have their own link objects and client COM objects in them are unaware of each other. However, since the goal of the link object is to allow the client BHO and Bar objects associated with one IE window to communicate with each other (and that these will always be in the same address space), the ambiguity about the total number of link objects on a user system is unimportant.

Figure 10:
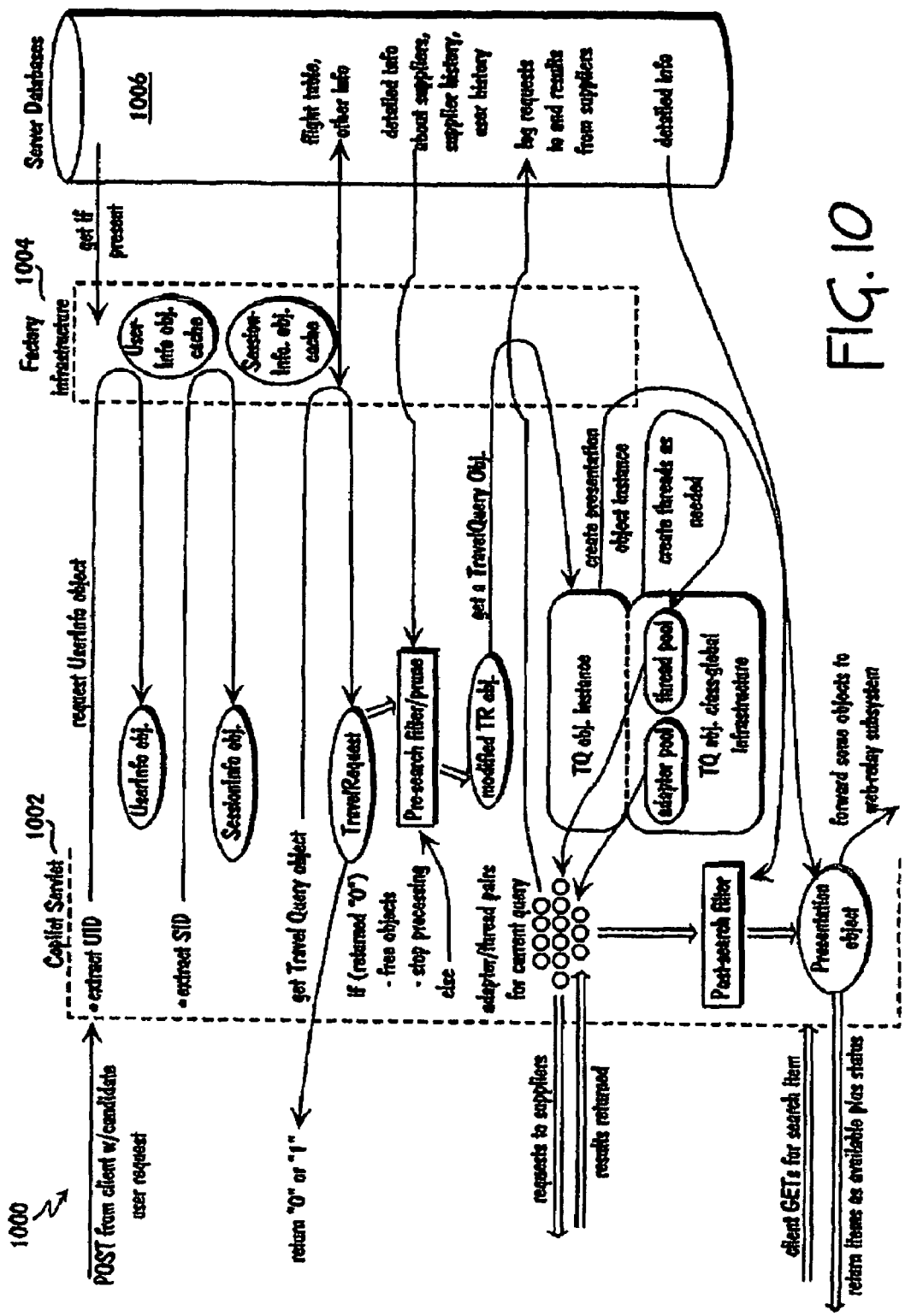
FIG. 10 is a diagram of a Copilot Servlet organization of an embodiment.

FIG. 10 is a diagram of a Copilot Servlet organization 1000 of an embodiment. This organization shows the information flow among the Copilot Servlet 1002, the factory infrastructure 1004, the system server databases 1006, the clients (not shown), and the supplier servers (not shown), but is not so limited. For each search request received from a client, the Copilot Servlet 1002 processes it by creating lists of suppliers to search, pruning the search list, searching via adapters, post search pruning/filtering, and presentation.

When the request is first received, the Copilot Servlet examines it to determine if it contains enough information to start a search. This process is performed by an input adapter module that is specific to the web page in which the user entered information, whether it was part of the client user interface or a third-party web site. If the request does not contain enough information or is not actually a search request, a "0 is returned to the client and processing terminates. If it does, a "1" is returned and processing continues with the next step. Further, alternate embodiments can implement other return codes or strings that result in other types of actions.

The Copilot Servlet determines a set of supplier systems to search in an attempt to find items that best satisfy the received itinerary. The determination is made using information including, but not limited to, the contents of the information received in the request, the user's personal information, the user's current selections in the client user interface (if the Bar is open), the recent history of searches and the amount of bandwidth the searches have recently used on each supplier system, and the history of prior searches of similar types by similar users.

The Copilot Servlet acquires a set of search adapter objects from an internal resource pool, and tasks one to search each of the selected suppliers. Each search adapter performs its search independently and asynchronously from the others, so that the subsequent steps in the Copilot Servlet processing sequence can handle incremental search results.

The server performs post-processing on the search results received. Post-processing is used to reduce the number of results that are presented to the user below the number of raw results found from the various suppliers. This is done in order to reduce the amount of data that the user has to sift through by providing only those results that are most likely to be selected.

This determination can be based on many criteria. For example, in the realm of air travel fares, many carriers quote fares much higher (3.times.or more) than their competition on some routes. Since it is very unlikely that a user would select these particular travel options in the face of the competition, the server is best serving the needs of the user by not cluttering the list of results with this type of item. In addition, the server can take into account factors including, but not limited to: the user's explicit preferences, as indicated by the personal information entered; the user's implicit prioritization, as indicated by the current sort-order selection in the client Bar; the particular user's past purchasing decisions when presented with similar options; and, the past purchasing decisions of aggregate groups of users presented with similar options.

The complexity of making pruning/filtering decisions on the data items found is increased by the results being received from different suppliers at different times, and being forwarded to the client for incremental display as quickly as possible. In order to provide incremental results to the client, the server applies filtering decisions to individual search results without certain data about the results that may or may not be subsequently received from supplier's that have not yet responded to the search request. There are a number of possible mechanisms that the server could employ to accomplish this decision making.

The simplest method is to generate a numeric score (applying the desired criteria) for each individual data item. Items achieving a score above a certain threshold are sent on immediately, items falling bellow a lower threshold are discarded, and those between the two thresholds are retained for further consideration. The system then adopts a target number of results to return from any search (or possibly a different target number for each category of search, such as the air travel, hotel, and rental care reservation categories). Since the number of suppliers being searched is known at the outset of a search (although an alternate embodiment can add the ability to start new searches of different suppliers incrementally if the initially-received results were judged inadequate), the threshold for deciding which results should be forwarded to a client can be adjusted up or down after each supplier's results are received and it can be determined whether the average number of results per supplier so far sent to the client is above or below the target average number of displayed results per supplier.

In addition to implementations in which the processing from an individual user action through the delivery of information is performed interactively and as quickly as possible, it is possible for other embodiments of the system to have relatively long latencies, either due to processing requirements or intentionally introduced, between different steps. For example, an embodiment can gather information from very slowly-responding suppliers. In this case, a mechanism could be introduced in which result information was delivered to the user separately from their (possibly implicit) request, such as by sending them an email instead of immediately displaying the results in the client. In this case, it may be advantageous to detect multiple user actions as triggering search operations without requiring that one operation complete or be aborted before the next is detected. Similarly, when information delivery is delayed it may be advantageous to accumulate all of the search results together for a single delivery instead of delivering them incrementally. If this is done, different methods may be used for post-search filtering which take advantage of the fact that all results can be filtered simultaneously when the system is in complete possession of all of the relevant information, rather than with partial (incremental) information as described herein.

There are many cases in which delays may be intentionally introduced in the system's operation. For example, the search system could provide a "notification" feature, whereby a particular (possibly implicit) user query is repeatedly processed over a period of time, and the use provided result information only when that information meets a particular criteria. Another possibility is that the system performs both immediate data delivery as well as subsequent, non-interactive delivery. For example, in an embodiment the system could consider the final purchase of an airline ticket (as detected by the buy tracking mechanism described herein) as the triggering event for a new search. The system could perform this search repeatedly over a period of time and filter the results using criteria based on the actual ticket purchased by the user. The system would then asynchronously notify the user if one of the periodic repeated searches finds a ticket that is better than the one the user purchased. In the arena of airline tickets, better might be constrained to be only a lower price for exactly the same ticket as business considerations might limit the user from exchanging the already purchased ticket for any other alternative. However, embodiments designed to handle different types of information might not need to be so limited.

In cases where the search system is used to search for information relating to purchasable items that have time-limited availability, such as airline tickets, the system may incorporate special features in order for delayed information return to be helpful. For example, if the system performs a search for a purchasable airline reservations delayed from the triggering user action, it is possible (if not likely) that the user will not be interacting with the client at the time results are obtained. Because of the fleeting validity of airline reservation information, the system could use a method for immediately notifying the user so that a purchase transaction could be completed. Such a method could include the use of a paging system or an asynchronous message to a wireless client, but is not so limited.

An alternative to being able to reliably notify the user of an available (desired) purchasable item is to have pre-authorization from the user to make the purchase on their behalf. This would require that the user supply, either previously or as part of their (possibly implicit) search-triggering action, payment information, a purchase authorization, and adequate selection criteria so that the user is satisfied with purchases that are automatically made.

Following search result processing, the individual result items are forwarded to the client. When forwarding results, each data item is inserted into an HTML/JavaScript display template, combined with the cookies set by the supplier web site (if any), and transmitted to the client.

The different server servlets of an embodiment are implemented using the object-oriented Java programming language. Given this, a key implementation detail is how the system creates the different component objects that make up each servlet. A "factory" system is used wherein a single, central piece of software, the factory, is called by all other portions of the software with requests to create new objects.

The larger components in the system are not created/referenced in a traditional way, but rather through component factories. The software modules using a component never actually know which implementation of the component is returned by a factory for their use. Rather, they always communicate through an interface (an API definition for the component). When the module using an object returned from a factory has to get a handle to an implementation of the interface, they request the handle from the factory. This allows the factory to create the component at that point, or to retrieve it from a temporary storage place, or to retrieve it from a database. The factory is the only system component aware of how the object instances are created and managed, and this can be changed without the awareness of any of the other software components communicating with or using the component.

Use of factories also allows the implementation of the component to be changed without any of its users being aware that a change has taken place. The actual class instantiated by the factory is determined by a property file, and can thus be changed without changing a single line of code. This mechanism allows rapid prototyping of new components, creating a so-called default implementation of the component (an implementation that returns valid results without implementing any of the real behavior of the component), and creates a complete system almost instantly. Individual developers can then work independently to create the actual components one by one, and replace the default components when the real components become available. The complete system works at any time, and can be run and tested with the newly developed component by simply changing a property.

In order to optimize the database accesses beyond the connection pooling mechanism described herein, an embodiment includes a generic object caching mechanism. The object cache caches the data obtained from database accesses, and keeps the object instance containing it available there for a future reference to the same data. After a certain period of non-use of the data, it is automatically removed from the object cache. A next access of the data will again obtain it from the database. The object caches rely on the principle of locality of time reference to reduce the actual requests that need to be made to the database. By implementing a generic base class that provides this functionality, it is easy to use object caching throughout the server.

Use of a factory abstracts the implementation of object creation from the rest of the software. In particular, this mechanism allows different objects that implement the same interface to be freely substituted for each other as the system implementation evolves. The particular object implementation that is used to serve each object-creation request that the factory receives is controlled by a server configuration data file referred to as the properties file. Additionally, the factory can manage caches and pools of previously-created or pre-allocated objects, to optimize the management of memory and/or processing effort.

The central module of the Copilot Servlet is referred to herein as the business logic. The business logic includes a relatively small portion of the servlet that is responsible for sequencing the operation of the remainder of the servlet. Any system changes necessary to accommodate coupling with fundamentally different types of client systems are accomplished with the business logic. For example, a client that is a stand-alone piece of software that is not integrated into a web browser (as might be appropriate on a hand held processing device), would not need to exchange information with the server concerning whether the Bar should be automatically opened. This type of change can be incorporated in the server with changes in the business logic.

The sequence of object creation and use that the business logic uses when servicing a client request includes, but is not limited to: creating a UserInfo object based on the UID in the request; creating a Sessioninfo object based on the UserInfo and the SID; and, creating a TravelRequest object. The UserInfo object is created to hold information keyed from the UID. The UserInfo object is initialized with data for a particular UID only while a session for that UID is open, but the data it contains is not session specific. When there is not one or more active session for a particular user (UID), the contents of the UserInfo object is stored in the server database until needed again.

When the UserInfo object is created by the factory, the factory first checks a cache of previously-created UserInfo objects and returns an object from the cache if present. This minimizes both object creations and accesses to the database, because multiple requests from the same UID are likely to occur together. If a User Info object for the desired UID is not present in the cache, a new User Info object is created and the factory attempts to populate it with data from the database.

New UID database entries are created only when the Start Servlet (which shares much of the underlying infrastructure with the Copilot Servlet, including the User Info object and the object factory) requests a UserInfo object from the factory and the desired UID is not already present in the database. If other servlets request UserInfo objects for non-existent UIDs, matching objects are created (or located within the cache), but the exception is logged as being potentially indicative of an attempt at unauthorized access to the system.

Just as the UserInfo object is created to hold UID-specific information while processing a request, the Sessioninfo object holds SID-specific information. Like the UserInfo object, Sessioninfo objects are cached within the factory so that multiple, rapid uses of the same SID do not require corresponding Sessioninfo objects to be created from scratch to serve each request.

Unlike the UserInfo object, the contents of SessionInfo objects are not stored by the server database, but the system is not so limited. Instead, SID-specific information is maintained as long as the session is active and then discarded when the session terminates (except for the data logged by transactions while the session was active, which is considered to be different from the randomly-accessible database records).

TravelRequest objects hold information that is specific to each unique information request that is sent from the client. The creation of the TravelRequest object accomplishes several critical parts of the Copilot Servlet function.

First, in the process of creating a TravelRequest object, the source of the information in the request is identified. In general, a request can either originate from the itinerary-entry controls in the client user interface or in the equivalent data entry portions of a third-party web page. In either case, there is a source-specific input adapter module that is used to process the content of requests that the client creates from user interaction with supported sources.

If the source of a request is not supported (for example, the request comes from a third-party web site that is included in the client list of URLs that should be forwarded to the server, but the actual browser navigation event that the client forwarded is from or to a page of the site that does not perform itinerary entry), or if the input adapter determines that the request was incomplete and did not contain enough information to start a search, then the TravelRequest object is created with a special value indicating that it is a non-valid request. This result causes the Copilot Servlet to respond to an incoming client request with a "0" string to inform the client that no additional data will be coming and that the Bar should not be automatically opened. If the Bar is already open, such a response does not result in Bar closure.

Assuming that enough information can be extracted from the client request to start a travel search, the TravelRequest object is populated with the extracted information. Thus, the combination of the input adapters, which extract the information, and the TravelRequest object, which serves as a receptacle for the information, serves to normalize the information needed to perform a search of suppliers into a common format for use by the rest of the Copilot Servlet components, regardless of the original source and format of the information.

Further, normalization of travel requests includes identifying the airports that are associated with the departure and arrival locations identified in the request. This is an important step because there are a number of roughly-equivalent ways in which users might specify the locations in their requests.

After the TravelRequest object is created, the business logic processes it through one or more pre-search filtering or pruning operations. Prior to these operations, the TravelRequest object has information that identifies the broadest possible set of travel suppliers that can be searched to fill the requested itinerary. For example, in searching for available airline reservations, the preferred embodiment builds a list of all the airlines (suppliers) supported by search adapters for which at least one departure and arrival airport (as there may be more than one possible alternate at each end) are listed as being served by the airline in the server database.

Another technique for determining whether a travel supplier should be searched based on the origin and destination of the trip uses a data table based on the actual flights that a supplier actually provides, and incorporating service rules in its construction. The system of an embodiment uses such a table, which incorporates not only actual supplier flights but also a numeric preference value with each airport pair in the table. The preference value is used during pruning, both by the explicit pruning mechanism and by the per-supplier pruning decisions made within search adapters, as a way to control the likelihood that a particular supplier will be searched for a given route, in light of other factors effecting search pruning.

Filtering and pruning are important optimizing steps for many reasons, although the exact set of optimization criteria are likely to be specific to a particular information domain searched. To continue with the air travel example, there are many idiosyncrasies in the way air travel is routed that could result in there not actually being any flights between two airports that are both served by the same airline. For example, if the airports are too close together, there may only be flights between them on commuter air carriers; larger carriers that serve both airports may either not have flights or have flights that are prohibitively priced. As another example, a single airline might serve two disparate regions, and even though one contains the arrival airport and the other contains the departure airport, the airline does not actually have flights between the two regions. Further, a particular supplier might be optimized out of the list to be searched based on user preferences and predictions made concerning the likelihood of a relevant result being returned from the search based on prior system experience.

Another criteria used to prune an air travel supplier out of the list of potential search targets is the home country of the supplier. For example, even though British Airways files to/from many United States cities, it may only be searched if one of origin and/or destination airports is in Britain.

There are three key system resources whose use can be improved by intelligently optimizing (reducing) the list of suppliers to be searched. One resource is network bandwidth between the server and the internet backbone. Because of practical constraints, each individual server of the system will have a finite amount of network bandwidth that can be employed to perform searches. By predicting which suppliers that might be searched are most likely to return relevant (to the particular current user) results, the amount of search server bandwidth consumed by each search can be minimized, resulting in greater system efficiency and lower cost.

Note that another, unrelated method of minimizing bandwidth is to use proprietary search connections with as many suppliers as possible instead of connections to human-oriented web sites. Web sites with human-friendly user interfaces typically transfer a significant amount of formatting and presentation information above and beyond the information actually of interest to the search server, wasting a significant fraction of the total bandwidth used to return results.

The second key resource is the network bandwidth of the supplier server systems. Assuming a generally high market acceptance of the system, it will be capable of generating significantly more total queries of supplier systems than the consumers using it would be able to generate on their own by accessing the same supplier web sites. As such, the system should not overwhelm the bandwidth (network and processing) capabilities of those supplier web servers that are accessed by search adapters. The pre-search filtering step gives the server the opportunity to remove a supplier from the list of suppliers to search based on the number of searches of that supplier that have been recently performed or are expected in the near future.

The third resource that can be optimized by reducing the number of suppliers to be searched, thereby improving the expected relevance of the results from each supplier, is the real time required for the search at all. The more rapidly the system can respond to an individual user request for information, the more satisfied the user is likely to be. Even if there were no bandwidth and processing limitations, the search would complete sooner the fewer suppliers that are searched. In addition, by searching suppliers that are more likely to return relevant results, an implicit reduction is made in the total number of results that will be displayed to the user. The shorter and more concise the list the user has to review, the more they perceive that the search occurred rapidly, even if it actually took the same amount of real time. At the conclusion of the filtering/pruning operations, the TravelRequest object contains information identifying the specific set of suppliers that the system will attempt to search with the user's request.

The TravelQuery object manages the actual search process. It manages class-global pools of idle processing threads and pre-created search adapter objects. When a new TravelQuery object is instantiated with a TravelRequest object, it obtains one thread and one search adapter for each supplier that the TravelRequest identifies as a search target. If the pools do not contain enough items to execute a particular query, more items are created. The TravelQuery assigns one supplier to each thread/search adapter pair and starts the search operations.

The server system performs numerous tasks in parallel. In order to achieve this parallelism, a large number of independent threads are created. Once the task has been completed the thread can be discarded. Since many of the tasks are of a similar nature, the system uses a thread pool. This saves the overhead of constant thread creation and destruction, and makes optimal use of the thread resources. When a task needs to be accomplished a thread is allocated from the pool and associated with the task. The thread then executes the task until completion after which the thread is returned to the pool. When no thread is available in the pool a new thread is automatically created, and returned to the pool after task execution. In order to protect against possible errors or memory leaks, a thread is re-cycled after it has executed a certain number of tasks. At this point the thread is destroyed instead of being returned to the pool. This mechanism will also automatically maintain the pool size at an appropriate level.

When each supplier search completes, the search results are provided to the request's Presentation object and the processing thread and search adapter objects are returned to the pools. Both pooled threads and adapters have their life spans monitored and are destroyed after they have been used 100 times, but are not so limited. This is done as insurance against the possibility of memory leaks or other potential mild-impact bugs in the servlets or the server operating system that could accumulate if the objects were allowed to persist indefinitely.

It is possible for a user to abandon a search while it is still in progress. This can occur due to a number of different user actions, ranging from abruptly closing the Bar or the entire web browser, to manipulating a client user interface control so that the search results are no longer displayed, or even by selecting the "reserve" control associated with an already-received data item. When this occurs, the search adapters are not explicitly notified. All of the Copilot Servlet objects involved in a particular search are allowed to complete the search. This prevents the connections between individual search adapters and supplier systems from being abruptly terminated, which might have undesirable side effects for the suppliers.

Instead, the TravelQuery object contains a flag indicating that processing should continue on the current query. If the user abandons a search, this flag is cleared. Each time an active search adapter reaches a point in the sequence of transactions with its supplier where the supplier system is in a stable state, the adapter checks the flag and, if it has been cleared, stops its operations.

There is a different search adapter module (object class) for each supplier system that is supported for searching and for each different search procedure that may be applied to a particular supplier. It is important that the search adapters be easy to create and modify as they are often customized to the design and content of a supplier's human-accessible web site. When this is the case, the search system has to constantly be monitored to ensure that changes to supplier web sites that stop the adapters from functioning do not occur.

Within each search adapter, there may be logic that applies supplier-specific algorithms to perform further pruning, to determine if the search of the supplier is actually appropriate for the current query. For example, there are air travel suppliers that may not accept bookings for very near-term flights (e.g., departing less than five days from the day of purchase). In this example, it is the responsibility of the individual adapter to determine if the current request is or is not likely to produce useful results if carried out for the adapter's supplier. By placing the responsibility for detailed supplier-specific decisions in the search adapters, it reduces the need to make descriptive/predictive information available to the higher-level pre-search pruning logic.

Another aspect of supplier-specific decision making carried out by the individual search adapter is regulation of the amount of bandwidth consumed by searches conducted on the adapter's supplier. This is accomplished through a combination of supplier-specific code and data (such as the desired maximum amount of bandwidth to consume from the supplier) plus code that is part of the search adapter base class and implements the bandwidth-tuning algorithm. In an embodiment, the most basic algorithm is a digital phase-locked loop (PLL). In order to allow the high-level pre-search pruning logic to take advantage of the decisions made by individual search adapters, each search adapter returns status information to the TravelQuery indicating whether or not it has started a requested search. This allows the pre-search pruning to start additional adapters if any of its first choice of adapters decides that performing the search is not actually appropriate. Similarly, when the high-level pre-search pruning logic requests that a search adapter start a search, it provides a numeric preference value, indicating the degree to which the pruning logic wants the adapter to perform the search. Each search adapter is free to interpret the preference value relative to supplier-specific criteria.

It is not only possible, but actually desirable in some cases to have multiple search adapters for the same supplier installed in the search server. In general, the decision making in different adapters for the same supplier should be complementary, so that only one of the adapters (if any) will actually perform a search for the same request. This ensures that the user will not be presented with multiple duplicate search results.

Real time searching of the Internet is by nature a very dynamic process. Updates to the search adapters have to be made on a regular basis. In order to minimally disrupt the system availability, a system embodiment includes a dynamic class loader, which allows for updating the search adapter objects while the system is running. The system itself detects that a new version of a class has been made available, removes all old versions of the class and starts using the new version of the class from that point on. Because this embodiment is implemented in Java, the details of this mechanism depend significantly on the structure of the Java programming language and execution environment, although the fundamental structure of the system is language-independent.

Java software is compiled from source code into an intermediate binary form (byte code), which is then interpreted at run time by a Java Virtual Machine (JVM). The management of loading new byte code files for execution by the JVM is handled, along with many other common and system functions, by parts of the Java runtime environment that are themselves written in Java and interpreted by the JVM, as opposed to being hard-coded parts of the JVM itself. For the purpose of loading new classes in a running Java system, the important parts of the Java runtime environment are the class loader classes and objects.

The class loader is the component of the runtime environment that is invoked by the Java new operator when a new object (instance of a class) has to be dynamically created. The default (system) class loader operates based on the name of the class for which an instance is to be created, and uses system configuration information and standardized conventions to locate and read the bytecode file that contains the implementation of the desired class. The class loader maintains a cache of the contents of the bytecode files for objects which have already been instantiated, so that multiple instantiations of the same object do not all incur the performance penalty of reading bytecode files.

In addition, the Java runtime environment makes provisions for the creation of custom class loaders, that may or may not be child classes of the system class loader. In particular, there is a standardized method, newInstance, that is used to invoke the class loader with explicit parameters concerning the class and bytecode files to load, rather than relying on the implicit locating of the bytecode file implemented by the system class loader. In the system of an embodiment, the determination as to which objects are instantiated by the system class loader and which use the system's special class loader is made explicitly in the source code based on whether new or newInstance is used to create object instances. In addition, an embodiment uses a commercial set of infrastructure libraries known as "Tomcat" in addition to the basic Java execution environment. Tomcat implements its own custom class loader on top of the Java system class loader, and the search system's class loader is built on top of the Tomcat class loader. In an embodiment, the custom class loader is used to create instances of all of the different types adapters, not just search adapters.

In order to support dynamic adapter updating without having to restart the entire server system, it is necessary to be able to remove the old version of an adapter from the class loader cache, and then cause new instances of the adapter to be instantiated from the new bytecode file. Unfortunately, the Java system class loader does not contain a method to unload classes. The commonly known work-around for this lack is to destroy the entire existing class loader object and instantiate a new one. Unfortunately, this causes the entire cache of loaded bytecode files to be lost, which is an unacceptable performance penalty. It is to overcome this problem that the system of an embodiment uses its custom class loader.

Each time an adapter is to be used (fetched from the pool), the TravelQuery object checks the time stamp of the adapter's bytecode file to determine if it has been updated since the last time it was loaded. If the adapter's bytecode has been updated, the TravelQuery object instructs the custom class loader to reload the class' bytecode file. The system's custom class loader includes a reinstantiate method that: removes the target class from the class loader's bytecode cache; instantiates a new class loader; passes the complete existing cache to the new class loader instance; and, destroys the old class loader instance.

At the conclusion of this operation, the new class loader instance can be used in the normal way (via newInstance) to instantiate the desired adapter, which will cause the new bytecode file to be loaded into the cache. Note that an alternate implementation could check the time stamps of all adapter bytecode files periodically instead of on-demand. Such an implementation would trade off the precision of the adapter updates versus the amount of processing consumed by checking adapter time stamps.

In addition to determining when an adapter's bytecode should be updated based on the presence and time stamps of files in the system's adapter bytecode directory, an embodiment of the system also uses the presence of different types of adapter files to determine the set of options available to the system. For example, the server maintains a copy of the URL lists stored on the client at all times. Note that one URL list directly corresponds to the available set of input adapters while the other URL list corresponds to the set of buy adapters. Each time the system detects a change in the set of available adapters, it updates its internal URL lists and the associated revision number. Subsequently, when new client sessions are established, the clients receive the new revision number and therefore download the updated URL list.

The revision number for each URL list consists of three numbers. The first two numbers come from the properties file while the third number is automatically incremented by the server in response to detecting changes in the available set of adapters. In a similar, internal manner, the list of suppliers that is used to create the original list of candidate suppliers to search for a request is based on the set of search adapter objects that are currently available. Note that it is possible for an adapter to be added or removed to the bytecode directory as well as being replaced, and the system reflects these changes in the available set of options as well. This is accomplished by a server process that periodically examines the bytecode file directory for the addition or removal of new adapters.

As discussed herein, the server uses at least one set of configuration data stored in the properties file. It is possible to implement the creation of search adapter objects based on a list of suppliers to be searched contained in the property files. However, a more efficient implementation is to determine the set of available adapters based on the Java bytecode files currently located in the search adapter executables directory on the system servers.

The implementation of the search adapters particularly benefits from an object-oriented programming language and design style. In the system of an embodiment, search adapters are created as child classes from a large search-adapter base class that provides common behaviors, interfaces, and services to ease the development of individual search adapters. In particular, the base class implements all of the adapter interfaces to the other server components. Similarly, the base class for search adapters implements a selection of primitive and/or common tool routines that specific search adapters can use to parse and extract data from web pages returned from requests the adapter makes to supplier web servers.

Another function of search adapters implemented in the base class is the detection and tracking of errors. Because search adapters interact with other unrelated systems across the coupled network or Internet, there is always the possibility that their operation will fail. The search system is, however, very tolerant of individual search failures because there are so many potential travel alternatives that can be presented from other suppliers. However, the search adapters track the number of failures from a particular supplier. A significant number of failures from the same supplier can be indicative of a change in the supplier web site that will require a change in the search adapter in order to allow it to work again. In the preferred embodiment, there is a mechanism to cause the detection of groups of search failures to automatically trigger the paging of an operator.

Moreover, as the search adapters are constructed using a common base class and implement identical interfaces, it is easier to use the search adapters in contexts other than the complete search system and the Copilot Servlet. For example, during the development of search adapters, a separate piece of test harness software is used to task individual adapters with specific searches under the control of the developer, circumventing the rest of the intelligence in the Copilot Servlet, which might serve to make testing of individual adapters more difficult.

The Copilot Servlet makes on-the-fly decisions for each set of search results provided by a search adapter regarding which of the result items are appropriate to forward on for display in the client. This decision, like the processing performed on the TravelRequest object to prune the set of suppliers to search, is accomplished by a series of processing operations performed on the search results once they are received.

The final object in the chain of the Copilot Servlet processing for a particular client request is the Presentation object. This object receives the different travel search results, asynchronously, after filtering, from the TravelQuery. The Presentation object is responsible for encapsulating the raw search results into HTML that is appropriate to the HTML already sent to the browser control in the client Bar.

In general, there is a single Presentation object associated with a SessionInfo object. The Presentation object retains the result data from the most recent of each different type of data search performed by the user. In an embodiment, this includes up to three sets of data: one each for air travel, hotel reservations, and rental car reservations. Each time a new TravelQuery is created/started for a user session, it is given a pointer to the SessionInfo object's Presentation object. Because TravelQuery objects are not immediately destroyed if the user abandons a search, it is possible for the Presentation object to receive interleaved results from multiple TravelQuery objects simultaneously. In order to allow the Presentation object to retain the information from the most recent search and discard the rest, each TravelQuery object is assigned a different search ID number, and the Presentation object discards search results marked with any search ID other than the most recent (of a particular type).

Regarding databases and database content, there are a number of logically-separate databases used by the server system. A collection of server systems shares one or more common, redundant database systems. One set of data stored in the server database includes copies of commercially available flight tables. This table lists all of the available commercial airline flights by supported suppliers. Not only is this table accessed directly, but it also contains the raw data from which the short list of suppliers that service listed airports is taken in construction of the first-order list of possible suppliers to search for a particular request.

A key capability of the system of an embodiment, because it is capable of directly accessing suppliers web sites, is that it can find and make available to users the so-called web specials of travel suppliers. A web special is a discounted price on an otherwise-available ticket that is offered only to people purchasing the ticket through the supplier's web site.

In order to optimize the list of suppliers that should be searched for a particular request, the system has to have information about which suppliers are likely to have which web specials available at any particular time. Unlike the information on regularly scheduled flights, which is essentially static, the set of web specials is highly fluid. Therefore, the database contains a cache of the web specials available from each supplier that performs this type of marketing. The cache is periodically refreshed by a pseudo-search request generated within the server.

While the primary means of searching employed by an embodiment is searching in direct response to a user action, it is noted that the search system of an embodiment also employs automatic searching performed asynchronously to user actions. Automatic searching may be used to facilitate any stage of the system's operation. For example, automatic searching may be performed to pre-fill data bases used as part of the filtering process before and after a search adapter operates. The results of automatic searching may also be incorporated into the information that is returned to a user as the result of a query. Additionally, nothing in the embodiments described herein should be interpreted to limit the search system to returning the information retrieved by search adapters to the user. For example, the results of queries to information suppliers could be used to filter the delivery of other data (possibly constant data or the results of automatic searching) to the user instead of the reverse.

As discussed herein, the UID-associated information is stored in the database. It is updated when the user invokes the client user-interface for editing their preference information, and fetched into a UserInfo object each time a new client/server session is created.

The interface between the search system and the various supplier systems is implemented by a search adapter. As detailed herein, there are three different categories of interfaces between an adapter and a supplier: through the supplier's commercial/consumer web site, through a GDS system, or through a custom, search system-specific interface.

In addition to searching supplier web sites and handing off users to the purchase pages of a supplier web site, the system is capable of performing the purchase hand-off by providing a travel agent number, otherwise known as an ARC number or IATA number, to the supplier. Thus, the owner of the ARC number is able to collect a travel agency commission on the sale.

In addition to the database that is a component of each separate server site of the system, a data warehouse is maintained in an embodiment. Recorded/created data is securely forwarded from the server databases to the data warehouse on a regular basis. The warehouse is used for both backup and long-term storage purposes. When data is forwarded to the warehouse, it is removed from the individual server sites. This ensures that the vast majority of data collected is not present on the servers, reducing their attractiveness to hackers as targets.

In addition, data processing and reduction is carried out at the warehouse in support of several functions. First, on a regular basis processes are executed to collect information on client purchases into invoices for individual suppliers with whom the service owner has a contractual relationship. Second, the accumulated data about user purchasing, combined with known, industry-specific trends, is used for forecasting both technical (future server load and bandwidth requirements) and business (revenue) trends.

In addition, the logs of user activity and travel component or airline pricing behavior accumulated by the system during its operation form a significant resource. This resource can be used for further exploitation and refinement of the system as well as a business asset that can be exploited to the degree that it can be made available to other businesses without compromising the service owner's position with suppliers or the privacy of the individual users who have transacted through the system.

Exploitation of the database for the service owner's benefit can be conducted through data mining and other types of analysis. In order to allow third-parties to make use of the data without violating user or supplier privacy, an application programming interface (API) and software architecture is established that allows components, or data analysis adapters, to be created and provided to the search system owner by third parties who want access to the data. The advantage of this arrangement, versus directly providing data sets to third parties, is that the API can be used to restrict the types and amounts of data that the analysis adapter can output to ensure that privacy is maintained.

Figure 11:
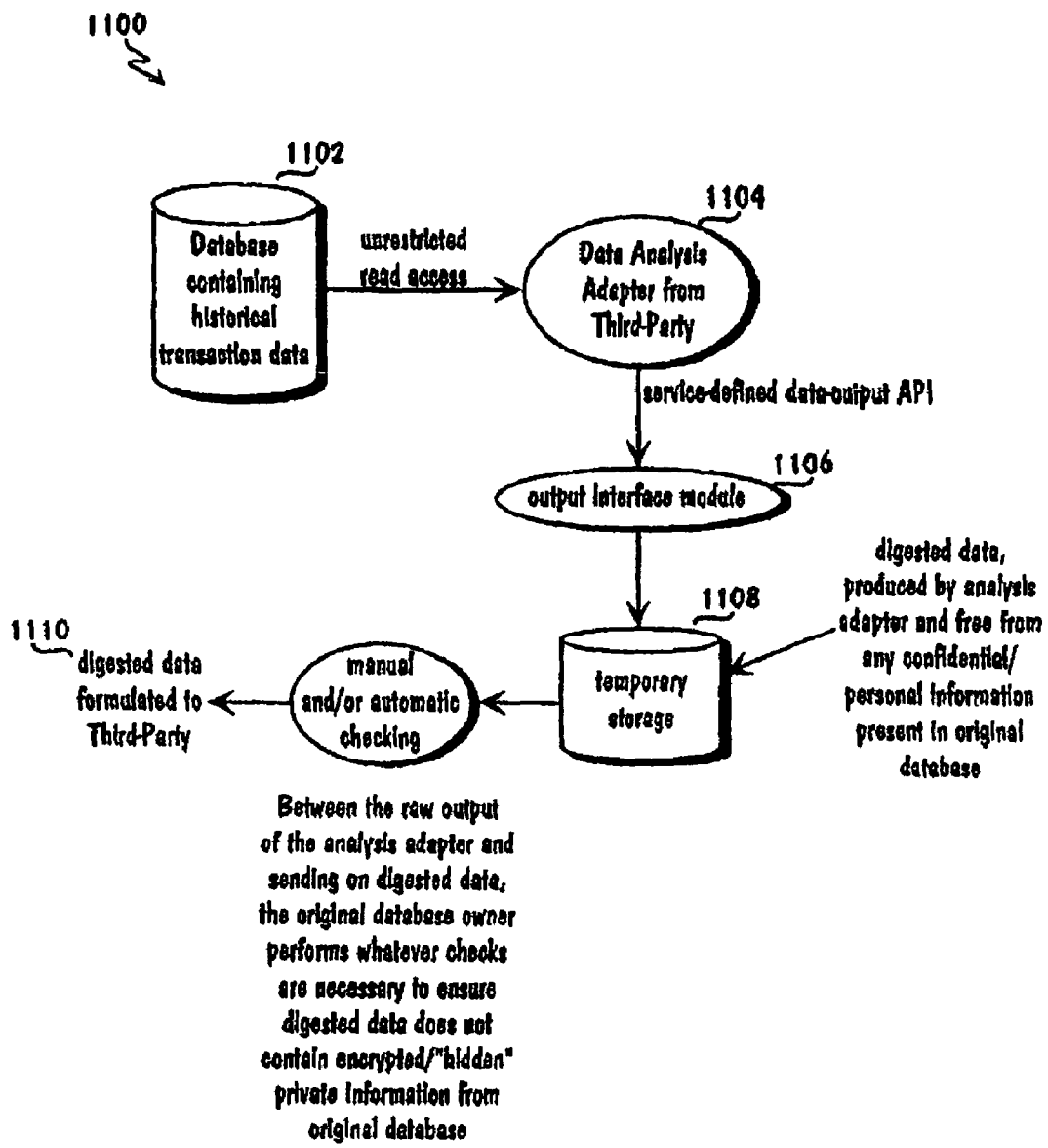
FIG. 11 shows a data analysis adapter configuration of an embodiment at a data warehouse.

There are several ways in which this method for providing third parties access to the system data can be incorporated into the system. For third parties who simply wish to perform data mining, the analysis adapter they provide can be run at the data warehouse, and output results provided for transmission back to the third party. FIG. 11 shows a data analysis adapter configuration 1100 of an embodiment at a data warehouse. This configuration 1100 supports information flow among at least one database 1102, at least one data analysis adapter 1104, an output interface module 1106, and temporary storage devices 1108 in the provision of digested data formulated to third parties 1110. This situation provides the analysis adapter 1104 the greatest freedom and access to data, but also presents the most significant risk of the third party attempting to exploit the access and circumvent the restrictions on data output imposed by the system API.

Another significant application of third party data analysis adapters is within the processing of individual user travel requests. The analysis adapters 1104 support a supplier offering dynamic and/or adaptive offers based on any of the data to which the system has access, including the specific user's prior purchasing behavior and the other bookings that the system has found from other suppliers. In this case, the analysis adapter 1104 has to be judged by the system owner as reliable enough to be distributed to and run on the server systems. In addition, the data needed by the analysis adapter 1104 must be available at the different server sites.

Figure 12:
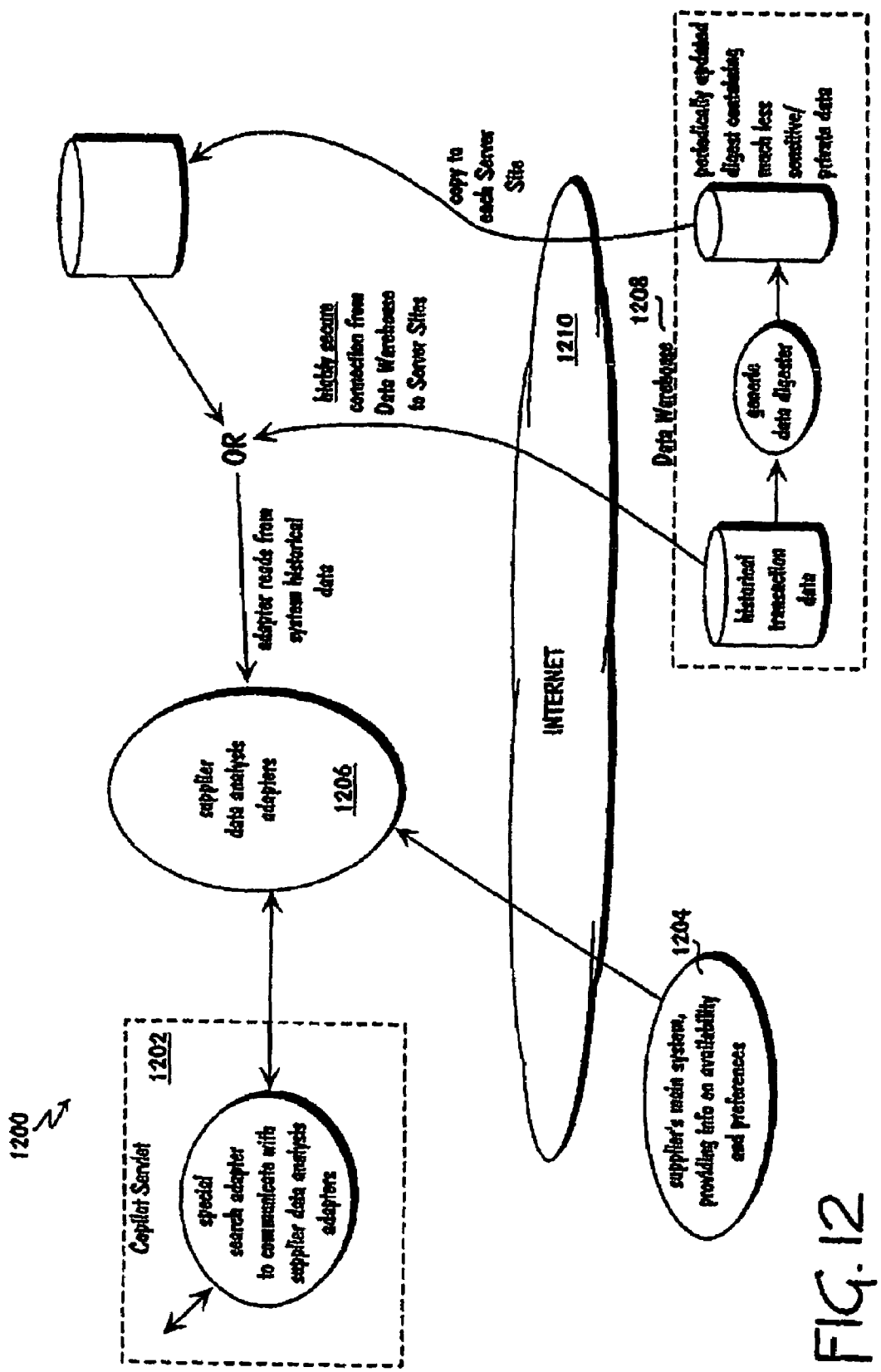
FIG. 12 shows a data analysis adapter configuration of an embodiment at a server site.

FIG. 12 shows a data analysis adapter configuration 1200 of an embodiment at a 1 5 server site. This configuration 1200 supports data flow among Copilot Servlets 1202, supplier systems 1204, supplier data analysis adapters 1206, and data warehouses 1208 via the Internet 1210, but is not so limited. Data is made available to server-resident analysis adapters in one of two ways, depending on the data needs of the adapters. First, processes can be run at the data warehouse to produce digests of the complete database. Assuming that the digest process provides summaries that are appropriate for the algorithms in the analysis adapter, the digests can be securely transferred to the server sites from the data warehouse without jeopardizing the entire database and provide as much benefit to third parties as would access to the full database.

Another alternative is to establish a secure, real-time link between the server sites and the data warehouse (possibly creating duplicate data warehouses to provide reliability and adequate bandwidth). This link can be used either to allow analysis adapters running at the server sites to query the full data set or to allow the adapters to execute within the data warehouses but to be queried themselves by the server sites.

There is a significant business and user-experience impact resulting from the exact point in time at which the client Bar auto opens and presents information to the user. In an embodiment, the client auto-open functionality essentially provides alternate information to that which is/will be provided by the data source that the user explicitly queried. Different perceived effects can be produced by altering the point in the user's primary sequence of operations at which the auto-open is performed and the type of information that is presented.

For example, auto-opening earlier (as soon as the user first goes to a page in a web site that would trigger a query-based auto open) gives the user the opportunity to use the inventive search system instead of the web site that they explicitly selected, but makes it appear less like a head-to-head competition either to present results or on price or other user-relevant criteria. Alternately, moving the point of auto-open later in time, so that auto-open does not occur until the user has evaluated the offers made by the site they originally chose, and has perhaps chosen one to purchase, gives the search system significantly more information on which to base its search. In addition to the itinerary information originally entered by the user, the system also has access to the travel options which the "other" web site presented and can attempt to infer the user's preferences and the price that they're willing to pay. In this case, the auto-open will appear to the user more as a counter-offer to the choice that they have already made than as an unbiased presentation of alternatives.

The combination of third-party data analysis adapters with an auto-open operation that occurs later in time than the "nominal" described herein is particularly powerful. Such an environment forms the foundation for a system in which (potentially) multiple suppliers have access to data regarding the specific user making a request and competing supplier offers, all without violating the privacy of any of the parties (via the "proxy" of the analysis adapter). This allows suppliers who can craft a sufficiently sophisticated analysis adapter the ability to make the best possible dynamic pricing and revenue-optimization choices, taking into account not only gross factors like seat availability but strategic considerations regarding routes or customer-loyalty optimization.

In an embodiment, search adapters are provided to access web pages because it is common practice for information suppliers to make information available through web (e.g., HTTP) servers. However, this should not be considered a limitation of the system. Any network-accessible information source, whether it is intended to provide human-readable or machine-readable information, may be used in place of a web server without altering the fundamental operation of the search system of an embodiment.

Similarly, data from web servers is typically broken into discrete blocks that are individually formatted for viewing by a user, referred to as web pages. However, this is an artificial division grown out of the general focus on using HTTP and HTML for a specific type of user-viewable information presentation, and should not be considered a limitation of the search system itself. One of the advantages of an embodiment using discrete search adapters is that it is relatively easy to modify the system to support different means of gathering and extracting information. For example, an information provider may use a system that does not return information in discrete "page" blocks. Additionally, adapters may process information based on the reception or monitoring of the data stream carrying the information, rather than waiting for the reception of complete "pages" of information before processing.

The description herein of various embodiments of the invention has been presented for purpose of illustration and description. It is not intended to limit the invention to the precise forms disclosed. Many modifications and equivalent arrangements will be apparent.

What is claimed is:

1. A computer implemented method for presenting an offer to a user, comprising:
    monitoring on a user computer a first communication session between browser software running on the user computer and a first server associated with a first website of a supplier of a travel-related item;
    evaluating on the user computer the monitored communication session to determine the presence of a first purchase offer received from the first server, the first purchase offer for a travel-related item;
    responsive to determining the presence of a first purchase offer, automatically opening a second communication session between the browser software running on the user computer and a second server associated with a second website;
    receiving from the second server via the second communication session, a second purchase offer for a travel-related item based at least in part on the first purchase offer; and
    presenting via the second communication session the second purchase offer to the user.

2. The method of claim 1, wherein the second purchase offer includes a price based at least in part on a price associated with the first purchase offer.

3. The method of claim 1, wherein a preference associated with the second purchase offer is based at least in part on a preference associated with the first purchase offer.

4. The method of claim 1, wherein the travel-related item associated with the first and second purchase offers is selected from the group including: (a) airline reservations, (b) lodging reservations, and (c) ground transportation reservations.

5. The method of claim 1, wherein the monitoring is carried out by monitoring software on the user computer operatively communicating with the browser software.

6. The method of claim 5, wherein the monitoring software comprises a browser helper object.

7. The method of claim 1, wherein the evaluation of the monitored communication session includes evaluating an information identifier, wherein the information identifier comprises information selected from the group including:
    (a) an HTTP header; (b) an HTTP POST; and (c) a URL.

8. The method of claim 1, wherein at least one of the monitoring, the evaluating, the opening, the receiving and the presenting is performed in real time.

9. The method of claim 1, wherein the steps are carried out in the order recited.

10. The method of claim 1, wherein the first communication session is delayed after the presence of the first purchase offer is determined.

11. The method of claim 10, wherein the second purchase offer is presented after the first communication session is delayed.

12. The method of claim 1, wherein presenting via the second communication session the second purchase offer further comprises:
    presenting the second purchase offer to the user after the evaluation of the monitored communication session determines the presence of the first purchase offer and after the user has chosen to make a purchase based on the first purchase offer.

13. The method of claim 12, further comprising:
    presenting the second purchase offer to the user after the evaluation of the monitored communication session determines the presence of the first purchase offer and after the user has chosen to make a purchase based on the first purchase offer by initiating an irrevocable transaction associated with the first purchase offer.

14. A computer program product, comprising a computer-readable storage medium having computer-executable code for presenting an offer to a user, the computer executable code for controlling a user computer to perform the operations of:
    monitoring on the user computer a first communication session between browser software running on the user computer and a first server associated with a first website of a supplier of a travel-related item;

evaluating on the user computer the monitored communication session to determine the presence of a first purchase offer received from the first server, the first purchase offer for a travel-related item;

responsive to determining the presence of a first purchase offer, automatically opening a second communication session between the browser software running on the user computer and a second server associated with a second website;

receiving from the second server via the second communication session, a second purchase offer for a travel-related item based at least in part on the first purchase offer; and presenting via the second communication session the second purchase offer to the user.

* * * * *